US012633262B2

(12) United States Patent
Kim et al.

(10) Patent No.: US 12,633,262 B2
(45) Date of Patent: May 19, 2026

(54) SCAN DRIVER, DISPLAY DEVICE USING THE SAME, AND ELECTRONIC DEVICE INCLUDING THE SAME

(71) Applicant: SAMSUNG DISPLAY CO., LTD., Yongin-si (KR)

(72) Inventors: Jong Hee Kim, Yongin-si (KR); Tak Young Lee, Yongin-si (KR); Bo Yong Chung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/185,422

(22) Filed: Apr. 22, 2025

(65) Prior Publication Data

US 2025/0391376 A1 Dec. 25, 2025

(30) Foreign Application Priority Data

Jun. 20, 2024 (KR) ........................ 10-2024-0080188
Nov. 12, 2024 (KR) ........................ 10-2024-0160401

(51) Int. Cl.
*G09G 3/3266* (2016.01)
*G09G 3/32* (2016.01)

(52) U.S. Cl.
CPC ............ *G09G 3/3266* (2013.01); *G09G 3/32* (2013.01); *G09G 2300/0819* (2013.01); *G09G 2310/0267* (2013.01); *G09G 2310/08* (2013.01)

(58) Field of Classification Search
CPC .................. G09G 3/3266; G09G 3/32; G09G 2300/0819; G09G 2310/0267; G09G 2310/08
See application file for complete search history.

(56) References Cited

U.S. PATENT DOCUMENTS

| | | | |
|---|---|---|---|
| 8,803,784 B2 | 8/2014 | Sakamoto et al. | |
| 9,524,690 B2 | 12/2016 | Lim et al. | |
| 9,576,543 B2 * | 2/2017 | He | G11C 19/28 |
| 10,909,897 B2 | 2/2021 | Lee et al. | |
| 11,127,339 B2 | 9/2021 | Kim et al. | |
| 11,250,767 B2 | 2/2022 | Park et al. | |
| 11,348,506 B1 | 5/2022 | Kim | |
| 11,637,170 B2 * | 4/2023 | No | G09G 3/3225 257/40 |
| 11,727,885 B2 | 8/2023 | Kim et al. | |
| 11,823,626 B2 | 11/2023 | Kim et al. | |
| 11,862,106 B2 | 1/2024 | Kim et al. | |
| 12,033,583 B2 | 7/2024 | Kim et al. | |
| 12,354,556 B2 * | 7/2025 | Shin | H10D 86/60 |
| 2024/0078962 A1 | 3/2024 | Kim et al. | |

FOREIGN PATENT DOCUMENTS

| | | | |
|---|---|---|---|
| CN | 114093333 | B | 5/2023 |
| KR | 10-2023-0082728 | A | 6/2023 |
| KR | 10-2023-0087700 | A | 6/2023 |
| KR | 10-2023-0172063 | A | 12/2023 |
| KR | 10-2024-0033722 | A | 3/2024 |

* cited by examiner

*Primary Examiner* — Antonio Xavier
(74) *Attorney, Agent, or Firm* — F. CHAU & ASSOCIATES, LLC

(57) ABSTRACT

A scan driver includes a plurality of stage circuits. A last stage circuit among the plurality of stage circuits includes a self-initialization signal unit charging a node of the last stage circuit to a first level in response to a clock signal an initialization initializing the last stage circuit when the node is at the first level.

17 Claims, 12 Drawing Sheets

SCAN DRIVER, DISPLAY DEVICE USING THE SAME, AND ELECTRONIC DEVICE INCLUDING THE SAME

CROSS-REFERENCE TO RELATED APPLICATION

This U.S. patent application claims priority under 35 U.S.C. § 119(a) to Korean Patent Application No. 10-2024-0080188 filed on Jun. 20, 2024 and 10-2024-0160401 filed on Nov. 12, 2024, which are incorporated by reference in their entireties herein.

TECHNICAL FIELD

The embodiments are directed to a scan driver, a display device using the same, and an electronic device including the same.

DISCUSSION OF RELATED ART

A display device is a connection medium between users and information. Examples of the display devices include a liquid crystal display device (LCD), an organic light emitting display device (OLED), and a plasma display panel (PDP).

The display device may include a data driver for supplying a data signal to data lines, a scan driver for supplying a scan signal to scan lines, and a display panel including pixels positioned in areas partitioned by the scan lines and the data lines.

The pixels included in the display panel are selected when a scan signal is supplied to a scan line, and receive a data signal from a data line. The pixels that receive the data signal supply light of a luminance corresponding to the data signal to the outside.

The scan driver includes stages connected to the scan lines. The stages supply the scan signal to the scan lines to which they are connected in response to signals from a timing controller. The last stage typically relies on an external reset signal among the signals provided from the timing controller. However, if the driving frequency changes, the frame period length varies, making it difficult to predict when to apply the reset signal.

SUMMARY

An embodiment of the disclosure removes the need for the external reset signal by modifying a last stage of a scan driver to initialize itself at an intended time point even if an end time point of a frame period changes due to a change in driving frequency.

A scan driver according to an embodiment of the invention includes a plurality of stage circuits. A last stage circuit among the plurality of stage circuits includes a self-initialization signal circuit charging a first node of the last stage circuit to a first level in response to a first clock signal and an initialization circuit initializing the last stage circuit when the first node is at the first level.

The last stage circuit may further include an input circuit charging a second node of the last stage circuit to the first level level in response to a gate voltage of a first logic level input to a first input terminal; an inverter circuit changing a voltage level of a third node of the last stage circuit according to a voltage level of the second node; an initialization control circuit controlling an operation of the initialization circuit in response to the voltage level of the third node; and an output circuit outputting a carry signal when the second node is at the first level, and the carry signal may initialize a previous stage circuit.

The initialization circuit may include a first transistor having a first electrode connected to the second node, a gate electrode connected to the first node, and a second electrode connected to the third node; and a second transistor having a first electrode connected to the third node, a gate electrode connected to the first node, and a second electrode connected to a first input terminal receiving a first reset power voltage.

The self-initialization signal circuit may include a third transistor having a first electrode connected to a second input terminal receiving the first clock signal, a gate electrode connected to the second node, and a second electrode connected to the first node; a fourth transistor having a first electrode connected to the first node, a gate electrode connected to a third input terminal receiving a carry signal from the previous stage circuit, and a second electrode connected to the first input terminal; and a fifth transistor having a first electrode connected to the first node, and a gate electrode and a second electrode connected to the first input terminal.

The self-initialization signal circuit may include a third transistor having a first electrode connected to a second input terminal receiving the first clock signal, a gate electrode connected to the second node, and a second electrode connected to the first node; a fourth transistor having a first electrode connected to the first node, a gate electrode connected to a third input terminal receiving a carry signal from the previous stage circuit, and a second electrode connected to the first input terminal; and a fifth transistor having a first electrode connected to the first node, a gate electrode connected to the inverter circuit, and a second electrode connected to the first input terminal.

The inverter circuit may include a sixth transistor having a first electrode connected to the gate electrode of the fifth transistor, a gate electrode connected to the second node, and a second electrode connected to a fourth input terminal receiving a second reset power voltage.

The self-initialization signal circuit may include a third transistor having a first electrode connected to a second input terminal receiving the first clock signal, a gate electrode connected to the second node, and a second electrode connected to the first node; and a fourth transistor having a first electrode connected to the first node, a gate electrode connected to the inverter circuit, and a second electrode connected to the first input terminal.

The inverter circuit may include a fifth transistor having a first electrode connected to the gate electrode of the fourth transistor, a gate electrode connected to the second node, and a second electrode connected to a fourth input terminal receiving a second reset power voltage.

The self-initialization signal circuit may include a third transistor having a first electrode connected to a second input terminal receiving the first clock signal, a gate electrode connected to the second node, and a second electrode connected to the first node; and a fourth transistor having a first electrode connected to the first node, a gate electrode connected to a third input terminal receiving a carry signal from the previous stage circuit, and a second electrode connected to the first input terminal.

A display device according to an embodiment of the invention includes a display panel including a plurality of pixels; and a scan driver supplying scan signals to the plurality of pixels. The scan driver includes a plurality of stage circuits. A last stage circuit among the plurality of stage circuits includes a self-initialization signal circuit charging a first node of the last stage circuit to a first level in response to a first clock signal and an initialization circuit initializing the last stage circuit when the first node is at the first level.

The last stage circuit may further include an input circuit charging a second node of the last stage circuit to the first level in response to a gate voltage of a first logic level input to a first input terminal; an inverter circuit changing a voltage level of a third node of the last stage circuit according to a voltage level of the second node; an initialization control circuit controlling an operation of the initialization circuit in response to the voltage level of the third node; and an output circuit outputting a carry signal when the second node is at the first level, and the carry signal may initialize a previous stage circuit.

The initialization circuit may include a first transistor having a first electrode connected to the second node, a gate electrode connected to the first node, and a second electrode connected to the third node; and a second transistor having a first electrode connected to the third node, a gate electrode connected to the first node, and a second electrode connected to a first input terminal receiving a first reset power voltage.

The self-initialization signal circuit may include a third transistor having a first electrode connected to a second input terminal receiving the first clock signal, a gate electrode connected to the second node, and a second electrode connected to the first node; a fourth transistor having a first electrode connected to the first node, a gate electrode connected to a third input terminal receiving a carry signal from the previous stage circuit, and a second electrode connected to the first input terminal; and a fifth transistor having a first electrode connected to the first node, and a gate electrode and a second electrode connected to the first input terminal.

The self-initialization signal circuit may include a third transistor having a first electrode connected to a second input terminal receiving the first clock signal, a gate electrode connected to the second node, and a second electrode connected to the first node; a fourth transistor having a first electrode connected to the first node, a gate electrode connected to a third input terminal receiving a carry signal from the previous stage circuit, and a second electrode connected to the first input terminal; and a fifth transistor having a first electrode connected to the first node, a gate electrode connected to the inverter circuit, and a second electrode connected to the first input terminal.

The inverter circuit may include a sixth transistor having a first electrode connected to the gate electrode of the fifth transistor, a gate electrode connected to the second node, and a second electrode connected to a fourth input terminal receiving a second reset power voltage.

The self-initialization signal circuit may include a third transistor having a first electrode connected to a second input terminal receiving the first clock signal, a gate electrode connected to the second node, and a second electrode connected to the first node; and a fourth transistor having a first electrode connected to the first node, a gate electrode connected to the inverter circuit, and a second electrode connected to the first input terminal.

The inverter circuit may include a fifth transistor having a first electrode connected to the gate electrode of the fourth transistor, a gate electrode connected to the second node, and a second electrode connected to a fourth input terminal receiving a second reset power voltage.

The self-initialization signal circuit may include a third transistor having a first electrode connected to a second input terminal receiving the first clock signal, a gate electrode connected to the second node, and a second electrode connected to the first node; and a fourth transistor having a first electrode connected to the first node, a gate electrode connected to a third input terminal receiving a carry signal from the previous stage circuit, and a second electrode connected to the first input terminal.

An electronic device according to an embodiment of the invention includes a display device for displaying an image. The display device includes a display panel including a plurality of pixels; and a scan driver providing a scan signal to each of the plurality of pixels. The scan driver includes a plurality of stage circuits. A last stage circuit among the plurality of stage circuits includes a self-initialization signal circuit charging a first node of the last stage circuit to a first level in response to a first clock signal and an initialization circuit initializing the last stage circuit when the first node is at the first level.

The last stage circuit may further include an input circuit charging a second node of the last stage circuit to the first level in response to a gate voltage of a first logic level input to a first input terminal; an inverter circuit changing a voltage level of a third node according to a voltage level of the second node; an initialization control circuit controlling an operation of the initialization circuit in response to the voltage level of the third node; and an output circuit outputting a carry signal when the second node is at the first level, and the carry signal may initialize a previous stage circuit.

The initialization circuit may include a first transistor having a first electrode connected to the second node, a gate electrode connected to the first node, and a second electrode connected to the third node; and a second transistor having a first electrode connected to the third node, a gate electrode connected to the first node, and a second electrode connected to a first input terminal receiving a first reset power voltage.

The self-initialization signal circuit may include a third transistor having a first electrode connected to a second input terminal receiving the first clock signal, a gate electrode connected to the second node, and a second electrode connected to the first node; a fourth transistor having a first electrode connected to the first node, a gate electrode connected to a third input terminal receiving a carry signal from the previous stage circuit, and a second electrode connected to the first input terminal; and a fifth transistor having a first electrode connected to the first node, and a gate electrode and a second electrode connected to the first input terminal.

The self-initialization signal circuit may include a third transistor having a first electrode connected to a second input terminal receiving the first clock signal, a gate electrode connected to the second node, and a second electrode connected to the first node; a fourth transistor having a first electrode connected to the first node, a gate electrode connected to a third input terminal receiving a carry signal from the previous stage circuit, and a second electrode connected to the first input terminal; and a fifth transistor having a first electrode connected to the first node, a gate electrode connected to the inverter circuit, and a second electrode connected to the first input terminal.

The inverter circuit may include a sixth transistor having a first electrode connected to the gate electrode of the fifth transistor, a gate electrode connected to the second node, and a second electrode connected to a fourth input terminal receiving a second reset power voltage.

The self-initialization signal circuit may include a third transistor having a first electrode connected to a second input terminal receiving the first clock signal, a gate electrode connected to the second node, and a second electrode connected to the first node; and a fourth transistor having a first electrode connected to the first node, a gate electrode connected to the inverter circuit, and a second electrode connected to the first input terminal.

The inverter circuit may include a fifth transistor having a first electrode connected to the gate electrode of the fourth transistor, a gate electrode connected to the second node, and a second electrode connected to a fourth input terminal receiving a second reset power voltage.

The self-initialization signal circuit may include a third transistor having a first electrode connected to a second input terminal receiving the first clock signal, a gate electrode connected to the second node, and a second electrode connected to the first node; and a fourth transistor having a first electrode connected to the first node, a gate electrode connected to a third input terminal receiving a carry signal from the previous stage circuit, and a second electrode connected to the first input terminal.

A scan driver according to an embodiment includes a plurality of main stage circuits, each configured to sequentially provide a scan signal to a display panel, and a plurality of back stage circuits connected in series with the plurality of main stage circuits. The plurality of back stage circuits include a last back stage circuit including a self-initialization signal circuit configured to generate a control signal to trigger initialization of the last back stage circuit in response to a clock signal, and an initialization circuit configured to perform initialization of the last back stage circuit based on the control signal generated by the self-initialization signal circuit. Additionally, the plurality of back stage circuits include at least one other back stage circuit preceding the last back stage circuit, wherein the at least one other back stage circuit is configured to receive an initialization signal from a preceding stage and transmit an initialization signal to a following stage in response to the received initialization signal.

DETAILED DESCRIPTION

Figure 1:
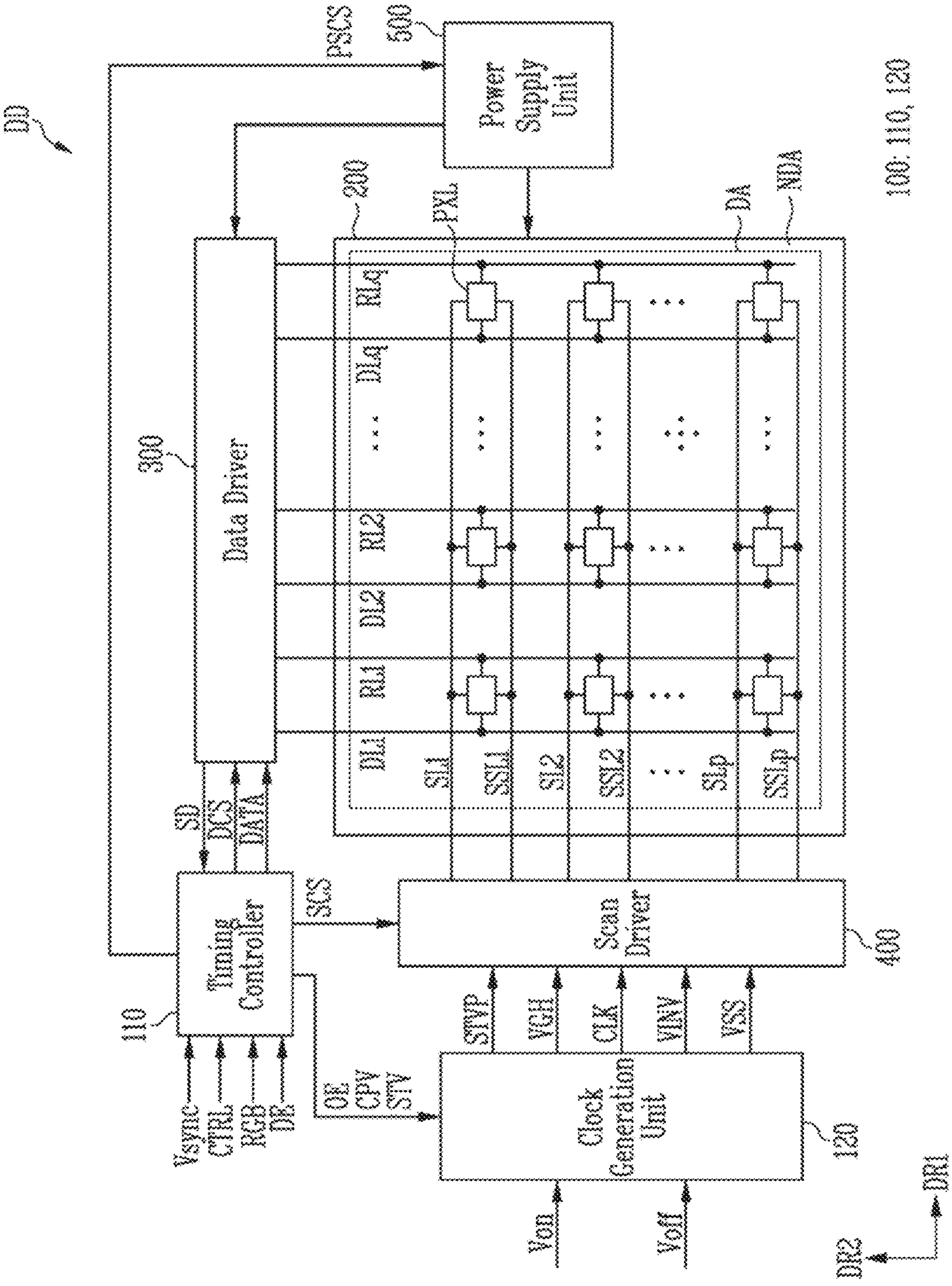
FIG. 1 is a block diagram illustrating an embodiment of a display device.

Hereinafter, embodiments according to the invention are described ion detail with reference to the accompanying drawings. It should be noted that in the following description, only portions necessary for understanding the operation according to the invention are described, and descriptions of other portions are omitted in order not to obscure the subject matter of the invention. In addition, the invention may be embodied in other forms without being limited to the embodiments described herein. However, the embodiments described herein are provided to describe in detail enough to implement the technical spirit of the invention to those skilled in the art to which the invention pertains.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the invention. Throughout the specification, in a case where a certain portion "includes", the case means that the portion may further include another component without excluding another component unless otherwise stated. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the scope disclosed herein.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, in an embodiment, the term "under" may include both directions of on and under. In addition, the device may face in other directions (for example, rotated 90 degrees or in other directions) and thus the spatially relative terms used herein are interpreted according thereto.

Various embodiments are described with reference to drawings schematically illustrating ideal embodiments. Accordingly, it will be expected that shapes may vary, for example, according to tolerances and/or manufacturing techniques. Therefore, the embodiments disclosed herein should not be construed as being limited to shown specific shapes, and should be interpreted as including, for example, changes in shapes that occur as a result of manufacturing. As described above, the shapes shown in the drawings may not show actual shapes of areas of a device, and the embodiments are not limited thereto.

Embodiments of the invention relate to a scan driver for a display device, specifically addressing the self-initialization of a stage circuit without requiring an external reset signal. In conventional designs, a timing controller provides a reset signal to initialize the last stage circuit at the end of each frame period. However, variations in driving frequency can shift the frame period's end time, making it difficult to time this reset signal correctly. The disclosed embodiments eliminate the need for this external reset signal by modifying the stage circuit to autonomously initialize itself using an existing clock signal. This ensures proper operation even if the frame period length changes.

The embodiments further enhance scan driver efficiency by enabling the last stage circuit to generate a carry signal, which initializes preceding stage circuits, ensuring seamless synchronization across the scan driver. Various embodiments achieve this through different configurations of a self-initialization signal unit, which determines when the stage should reset. Alternatively, in some embodiments, the stage circuit directly supplies the clock signal to its initialization unit for self-initialization, further simplifying the design. This approach enhances timing reliability, reduces dependency on external control, and enhances power efficiency in modern display devices.

FIG. 1 is a block diagram illustrating an embodiment of a display device.

Referring to FIG. 1, a display device DD may include a signal providing unit 100, a display panel 200, a data driver 300 (e.g., a first driver circuit), a scan driver 400 (e.g., a second driver circuit), and a power supply unit 500 (e.g., a power supply). The signal providing unit 100 may include a timing controller 110 (e.g., a controller circuit) and a clock generation unit 120 (e.g., a clock signal generator circuit).

The display device DD may be a flat panel display device, a flexible display device, a curved display device, a foldable display device, a bendable display device, or a stretchable display device. In addition, the display device DD may be a transparent display device, a head-mounted display device, or a wearable display device. In addition, the display device DD may be applied to various electronic devices, such as a smartphone, a tablet personal computer (PC), a smart pad, a television (TV), and a monitor.

The display device DD may be implemented as a self-light emitting display device including a plurality of self-light emitting elements. For example, the display device DD may be an organic light emitting display device including organic light emitting elements, a display device including inorganic light emitting elements, or a display device including light emitting elements composed of a composite of inorganic and organic materials. However, this is only an example, and the display device DD may also be implemented as a liquid crystal display device, a plasma display device, a quantum dot display device, or the like.

The display panel 200 may include a display area DA for displaying an image and a non-display area NDA surrounding the display area DA. For example, the non-display NDA is typically reserved for control circuits and does not include pixels for displaying the image.

The display panel 200 may include pixels PXL, scan lines SL1 to SLP, sensing control lines SSL1 to SSLq, data lines DL1 to DLq, and sensing lines RL1 to RLq connected to the pixels PXL. For example, in the display panel 200, pixels PXL of each row arranged in a first direction DR1 may be commonly connected to a scan line extending in the first direction DR1 and a sensing control line extending in the first direction DR1. Pixels PXL of each column arranged in a second direction DR2 may be commonly connected to a data line extending in the second direction DR2 and a sensing line extending in the second direction DR2.

A first power source ELVDD (see FIG. 2) and a second power source ELVSS (see FIG. 2) may be supplied to each pixel PXL. The pixel PXL may receive the first power source ELVDD and the second power source ELVSS from the power supply unit 500 described below. The first power source ELVDD may be a high potential voltage, and the second power source ELVSS may be a lower voltage than the first power source ELVDD.

Figure 2:
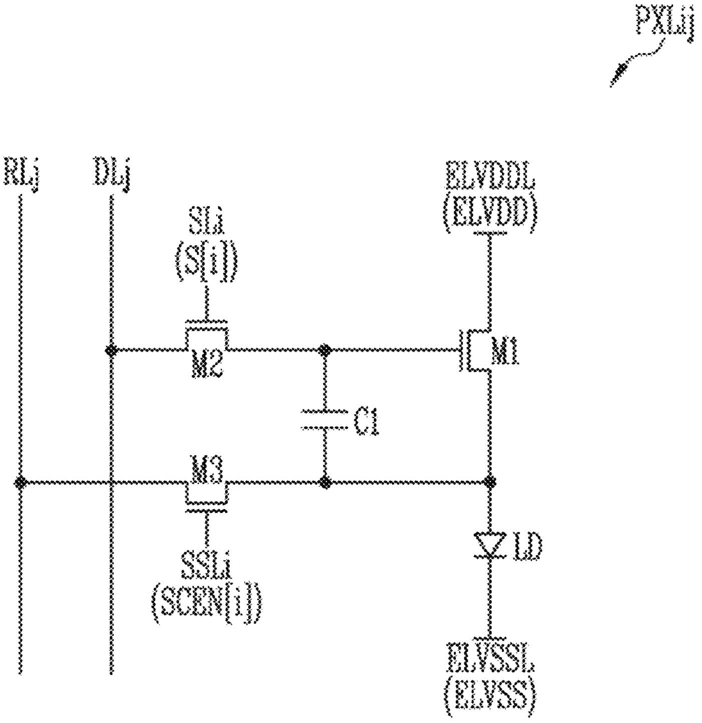
FIG. 2 is a diagram for explaining a pixel of the display device according to an embodiment of the invention.

The pixels PXL may include light emitting diodes LD (see FIG. 2). Each pixel PXL may generate light corresponding to a data signal by current flowing from a first power source line ELVDDL to a second power source line ELVSSL via a light emitting diode LD.

The timing controller 110 may generate control signals for controlling the data driver 300, the scan driver 400, and the power supply unit 500.

For example, the control signals may include a data driver control signal DCS for controlling the data driver 300, a scan driver control signal SCS for controlling the scan driver 400, and a power supply unit control signal PSCS for controlling the power supply unit 500.

The timing controller 110 may generate the data driver control signal DCS, the scan driver control signal SCS, and the power supply unit control signal PSCS using an external input signal. The external input signal may be provided from a processor 1010 (see FIG. 11).

For example, the external input signal may include a data enable signal DE, a vertical synchronization signal Vsync, and a control signal CTRL.

In addition, the timing controller 110 may supply the data driver control signal DCS to the data driver 300, the scan driver control signal SCS to the scan driver 400, and the power supply unit control signal PSCS to the power supply unit 500.

The timing controller 110 may receive an image signal RGB from the outside (or the processor 1010). The timing controller 110 may convert the data format of the image signal RGB to be suitable for interfacing with the data driver 300 and generate an image data signal DATA.

The image data signal DATA may include luminance information of each pixel PXL of the display panel 200, and the image data signal DATA may be divided into frame units. For example, the image data signal DATA may be processed by the timing controller 110 and divided into discrete frame-based intervals. Each frame unit corresponds to a complete image or screen update cycle, ensuring synchronization with the display's refresh rate before being transmitted to the data driver 300 for pixel-level rendering.

The data enable signal DE may be a signal defining a period during which a valid image signal RGB is input. The data enable signal DE may include a high level period and a low level period. During a period in which the data enable signal DE is maintained at a high level, the timing controller 110 may latch the image signal RGB.

The vertical synchronization signal Vsync may define a frame period. The vertical synchronization signal Vsync may be provided in the form of repeating pulses, and a cycle of the vertical synchronization signal Vsync may correspond to a cycle of the frame period.

In some embodiments, the vertical synchronization signal Vsync may be provided to the timing controller 110. In other embodiments, the timing controller 110 may generate the vertical synchronization signal Vsync in response to the control signal CTRL. In other words, the vertical synchronization signal Vsync may be a signal generated internally in the display device DD.

The timing controller 110 may supply a first scan start signal STV and a clock generation control signal OE or CPV to the clock generation unit 120.

The clock generation unit 120 may receive a gate-on voltage Von and a gate-off voltage Voff from the outside (or the processor 1010). In addition, the clock generation unit 120 may receive the first scan start signal STV and the clock generation control signal OE or CPV from the timing controller 110.

The clock generation unit 120 may generate a scan start signal STVP using the first scan start signal STV, generate a clock signal CLK using the clock generation control signal OE or CPV, and generate a reset power source VSS, a gate high voltage VGH, and a first voltage VINV using the gate-on voltage V on and the gate-off voltage Voff.

The clock generation unit 120 may provide the scan start signal STVP, the clock signal CLK, the reset power source VSS, the gate high voltage VGH, and the first voltage VNIV to the scan driver 400. In addition to this, there may be additional voltages generated by the clock generation unit 120 and provided to the scan driver 400, and the clock generation unit 120 is not limited to that shown in FIG. 1.

The data driver 300 may receive the data driver control signal DCS and the image data signal DATA from the timing controller 110.

The data driver 300 may supply data signals to the data lines DL1 to DLq according to the image data signal DATA. In this way, a data signal supplied to each data line may be determined according to the image data signal DATA and may have a data voltage corresponding to a grayscale value of the image data signal DATA.

When a data signal is supplied to a specific data line, a pixel PXL connected to the specific data line may receive the data signal transmitted through a corresponding data line, and the pixel PXL may emit light with a luminance corresponding to the supplied data signal.

The data driver 300 may supply an initialization voltage supplied from the power supply unit 500 to a sensing line RL under the control of the timing controller 110.

The data driver 300 may receive a sensing current from pixels PXL of a selected row among the pixels PXL through first to q-th sensing lines RL1 to RLq. For example, the data driver 300 may receive a sensing current from pixels PXL of one row in a vertical blank period (for example, a sensing period) between adjacent display periods.

In addition, the data driver 300 may calculate characteristics of the pixels PXL of the selected row based on the sensing current and provide sensing data SD corresponding to the calculated characteristics to the timing controller 110. In some embodiments, the characteristics of the pixels PXL may include at least one of threshold voltages of driving transistors of the pixels PXL, mobilities of the driving transistors, or characteristics of light emitting elements. The timing controller 110 may compensate for the image signal RGB based on the sensing data SD and provide the image data signal DATA to the data driver 300 based on the compensated image signal RGB.

According to an embodiment, a sensing unit may be provided separately in the display device, and the sensing line RL may be connected to the sensing unit. This sensing unit may receive a sensing current, calculate sensing data, and provide the sensing data to the timing controller 110.

For connection with the data lines DL1 to DLq and the sensing lines RL1 to RLq, the data driver 300 may be directly mounted on a substrate on which the pixels PXL are formed, or may be connected to the substrate through a separate component such as a flexible circuit board.

The scan driver 400 may receive the scan driver control signal SCS from the timing controller 110. The scan driver 400 may generate a scan signal and a sensing control signal in response to the scan driver control signal SCS.

The scan driver 400 may provide the scan signal to a scan line and the sensing control signal to a sensing control line in response to the scan start signal STVP. For example, the scan signal may be set to a gate-on voltage that can turn on a transistor included in the pixel PXL, and the scan signal may be used to apply the data signal (or data voltage) to the pixel PXL. In addition, the sensing control signal may be set to a gate-on voltage that can turn on a transistor included in the pixel PXL. The sensing control signal may be used to sense (or extract) a driving current flowing through the pixel PXL or to apply the initialization voltage to the pixel PXL. The time point and waveform at which the scan signal and the sensing control signal are supplied may be set differently depending on an active period, the sensing period, the vertical blank period, or the like.

For connection with the scan lines SL1 to SLp and the sensing control lines SSL1 to SSLp, the scan driver 400 may be directly mounted on the substrate on which the pixels PXL are formed, or may be connected to the substrate through a separate component such as a flexible circuit board.

FIG. 1 shows the timing controller 110, the data driver 300, and the scan driver 400 separately, but at least some of the components may be integrated as needed.

The power supply unit 500 may generate the first power source ELVDD, the second power source ELVSS, and the initialization voltage, and supply the first power source ELVDD, the second power source ELVSS, and the initialization voltage to the pixel PXL through power source lines (for example, the first power source line ELVDDL, the second power source line ELVSSL, and the like). The power source lines may be provided in the display panel 200, and the initialization voltage may be supplied to the pixel PXL through the sensing line RL.

The power supply unit 500 may control the first power source ELVDD, the second power source ELVSS, and the initialization voltage using the power supply unit control signal PSCS received from the timing controller 110. For example, the second power source ELVSS in the sensing period may be set higher than the second power source ELVSS in the display period.

In an embodiment, the power supply unit 500 may be implemented as a power management integrated circuit (PMIC), but the invention is not limited thereto. According to an embodiment, the power supply unit 500 may generate only the initialization voltage and supply only the initialization voltage to the pixel PXL, and a separate integrated circuit may generate the first power source ELVDD and the second power source ELVSS and supply the first power source ELVDD and the second power source ELVSS to the pixel PXL.

FIG. 2 is a diagram for explaining a pixel of the display panel 200 according to an embodiment of the invention.

Referring to FIG. 2, a pixel PXLij may include transistors M1, M2, and M3, a storage capacitor Cst, and a light emitting diode LD.

In the following, a circuit of the pixel having N-type transistors is described as an example. However, the circuit may instead include P-type transistors by changing the polarity of the voltage applied to a gate terminal. Similarly, the circuit could be revised to have a combination of P-type transistors and N-type transistors. A P-type transistor may generally refer to a transistor in which the amount of current increases when a voltage difference between a gate electrode and a source electrode increases in a negative direction. An N-type transistor may generally refer to a transistor in which the amount of current increases when a voltage difference between a gate electrode and a source electrode increases in a positive direction. The transistors may be configured in various forms, such as a thin film transistor (TFT), a field effect transistor (FET), and a bipolar junction transistor (BJT).

A first transistor M1 may have its gate electrode connected to a second electrode of a second transistor M2, its first electrode connected to the first power source line ELVDDL, and its second electrode connected to an anode of the light emitting diode LD. The first power source ELVDD may be supplied to the first electrode of the first transistor M1 through the first power source line ELVDDL. The first transistor M1 may be referred to as a driving transistor.

The second transistor M2 may have its gate electrode connected to an i-th scan line SLi, its first electrode connected to a j-th data line DLj, and its second electrode connected to the gate electrode of the first transistor M1. A scan signal S[i] may be supplied to the gate electrode of the second transistor M2 through the i-th scan line SLi.

A third transistor M3 may have its gate electrode connected to an i-th sensing control line SSLi, its first electrode connected to a j-th sensing line RLj, and its second electrode connected to the anode of the light emitting diode LD. A sensing control signal SCEN[i] may be supplied to the gate electrode of the third transistor M3 through the i-th sensing control line SSLi.

A first electrode of the storage capacitor C1 may be connected to the gate electrode of the first transistor M1, and a second electrode of the storage capacitor C1 may be connected to the anode of the light emitting diode LD.

The light emitting diode LD may have its anode connected to the second electrode of the first transistor M1 and its cathode connected to the second power source line ELVSSL. The second power source ELVSS may be supplied to the cathode of the light emitting diode LD through the second power source line ELVSSL. The light emitting diode LD may be an organic light emitting diode, an inorganic light emitting diode, a quantum dot/well light emitting diode, or the like. Although the pixel PXij is illustrated in FIG. 2 including one light emitting diode LD as an example, in other embodiments, the pixel PXij may include a plurality of light emitting diodes connected in series, in parallel, or in series and parallel.

The first power source ELVDD may be applied to the first power source line ELVDDL, and the second power source ELVSS may be applied to the second power source line ELVSSL. For example, during the display period, a voltage of the first power source may be higher than a voltage of the second power source.

When a scan signal of a turn-on level (here, a logic high level) is applied through the i-th scan line SLi, the second transistor M2 may be turned on. In this case, a data voltage applied to the data line DLj may be stored across the first electrode and the second electrode of the storage capacitor C1.

A driving current, determined by a voltage difference between the first electrode and the second electrode of the storage capacitor C1, may flow between the gate electrode and the second electrode of the first transistor M1. As a result, the light emitting diode LD may emit light with a luminance corresponding to data voltages (or data signals DATA).

Next, when a scan signal of a turn-off level (here, a logic low level) is applied through the i-th scan line SLi, the second transistor M2 may be turned off, and the j-th data line DLj and the first electrode of the storage capacitor C1 may be electrically separated. Therefore, even if the data voltages (or data signals DATA) of the data line DLj change, the voltage stored in the first electrode of the storage capacitor C1 should not change.

However, the embodiments of the invention are not limited to the pixel PXLij of FIG. 2 and may be applied to pixels of other pixel circuits.

Figure 3:
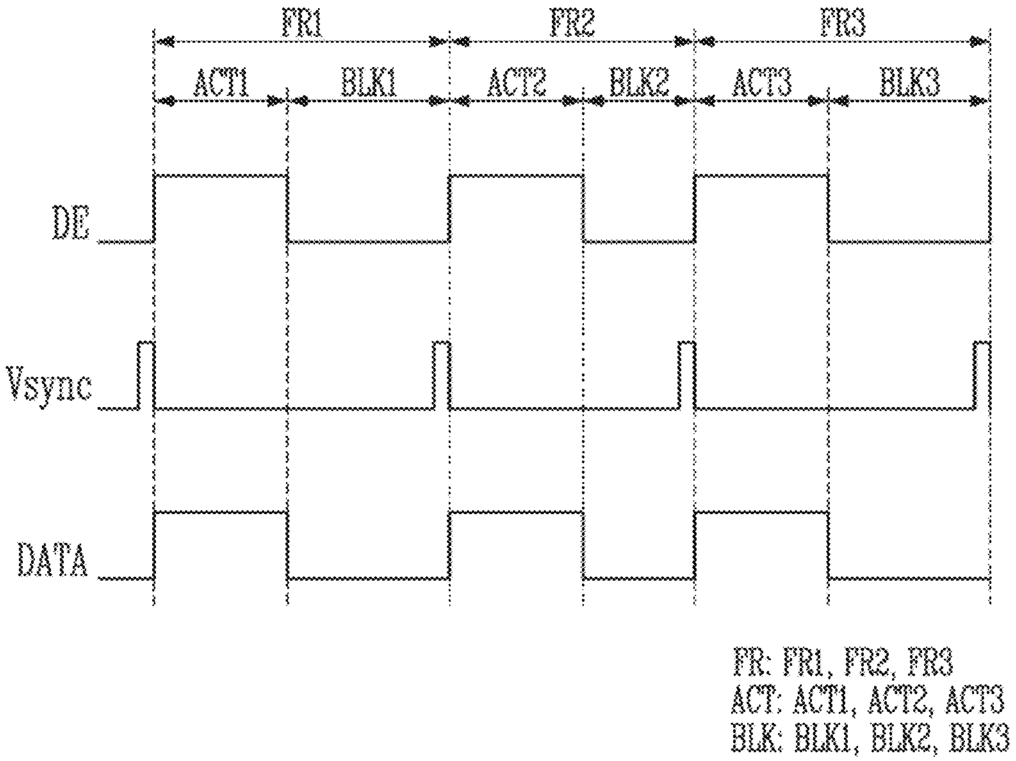
FIG. 3 is a diagram for explaining a data enable signal, a vertical synchronization signal, and data signals according to a driving frequency.

FIG. 3 is a diagram for explaining a data enable signal, a vertical synchronization signal, and data signals according to a driving frequency.

Referring to FIG. 3, the data enable signal DE may include a display period ACT and a blank period BLK within one frame period FR. The display period ACT may be a period during which the display panel 200 displays an image, and the blank period BLK may be a period during which the display panel 200 does not display an image.

The blank period BLK may be arranged between display periods ACT. For example, the first blank period BLK1 may be arranged between display periods ACT1 and ACT2 and the second blank period BLK2 may be arranged between display periods ACT2 and ACT3.

During the display period ACT in the frame period FR, the scan signals may be supplied from the scan driver 400 to the pixels PXL through the scan lines. In an embodiment, during the blank period BLK in the frame period FR, the scan signals are not supplied from the scan driver 400 to the pixels PXL, but instead, initialization of stage circuits within the scan driver 400 are terminated. In other words, the supply of the scan signals to the pixels PXL and the initialization of the stage circuits within the scan driver 400 may be performed in units of one frame period FR.

Referring to FIG. 3, the frame periods FR may include first to third frame periods FR1 to FR3. The first frame period FR1 may include a first display period ACT1 and a first blank period BLK1. The second frame period FR2 may include a second display period ACT2 and a second blank period BLK2. The third frame period FR3 may include a third display period ACT3 and a third blank period BLK3.

The vertical synchronization signal Vsync may include a high level period and a low level period. A cycle of the vertical synchronization signal Vsync may change depending on the driving frequency. For example, as the driving frequency increases, the cycle of the vertical synchronization signal Vsync may become shorter. For example, as the driving frequency decreases, the cycle of the vertical synchronization signal Vsync may become longer.

At a time point where the vertical synchronization signal Vsync transitions from a high level to a low level, the frame period FR may start. For example, at a time point where the vertical synchronization signal Vsync transitions to the low level, each of the first to third frame periods FR1 to FR3 may start.

The data enable signal DE may define the blank period BLK and the display period ACT included in each of the frame periods FR. The data enable signal DE may have a high level during the display period ACT and a low level during the blank period BLK. For example, the data enable signal DE may have the high level in the first to third display periods ACT1 to ACT3. The data enable signal DE may have the low level in the first to third blank periods BLK1 to BLK3.

During a period in which the data enable signal DE is maintained at the high level, the data signals DATA may be output from the data driver 300. For example, during the first to third display periods ACT1 to ACT3, the data signals DATA may be output from the data driver 300.

During a period in which the data enable signal DE is maintained at the low level, new data signals DATA should not be output from the data driver 300. For example, during the first to third blank periods BLK1 to BLK3, new data signals DATA should not be output.

The blank period BLK may correspond to an emission period in which the pixel emits light according to the data signals DATA written in the display period ACT. For example, the first blank period BLK1 may correspond to an emission period in which the pixel emits light according to the data signals DATA written in the first display period ACT1.

In FIG. 3, it is assumed that the first frame period FR1 and the third frame period FR3 are driven at a driving frequency of 30 Hz. In addition, it is assumed that the second frame period FR2 is driven at a driving frequency of 60 Hz. However, embodiments of the invention are not limited thereto.

The length of the display period ACT may be substantially the same regardless of the driving frequency. For example, the lengths of the first to third display periods ACT1 to ACT3 may be substantially the same.

On the other hand, the length of the blank period BLK may vary depending on the driving frequency. The higher the driving frequency of the frame period FR, the shorter the length of the blank period BLK. For example, in FIG. 3, the lengths of the first and third blank periods BLK1 and BLK3 may be longer than the length of the second blank period BLK2.

In a driving situation where the scan signals are supplied to the pixels PXL in units of one frame period FR, the length of the blank period BLK may change if the driving frequency changes. As the length of the frame period FR changes, time points at which the scan signals are applied to each of the pixels PXL and the stage circuits within the scan driver 400 are initialized may become different. For example, when the display device DD is driven at a high driving frequency, the length of the blank period BLK may be shortened, and the time points at which the scan signals are applied to each of the pixels PXL and the stage circuits within the scan driver 400 are initialized may be accelerated. For example, when the display device DD is driven at a low driving frequency, the length of the blank period BLK may be longer, and the time points at which the scan signals are applied to each of the pixels PXL and the stage circuits within the scan driver 400 are initialized may be delayed.

When the driving frequency of the display device DD changes, the length of the blank period BLK changes and the length of the frame period FR changes, making it difficult to predict the end time point of the frame period FR. In addition, it may be difficult for the signal providing unit 100 to accurately generate a signal (or reset signal) to initialize the last stage circuit among the stage circuits within the scan driver 400 at the end time point of the frame period FR.

Figure 4:
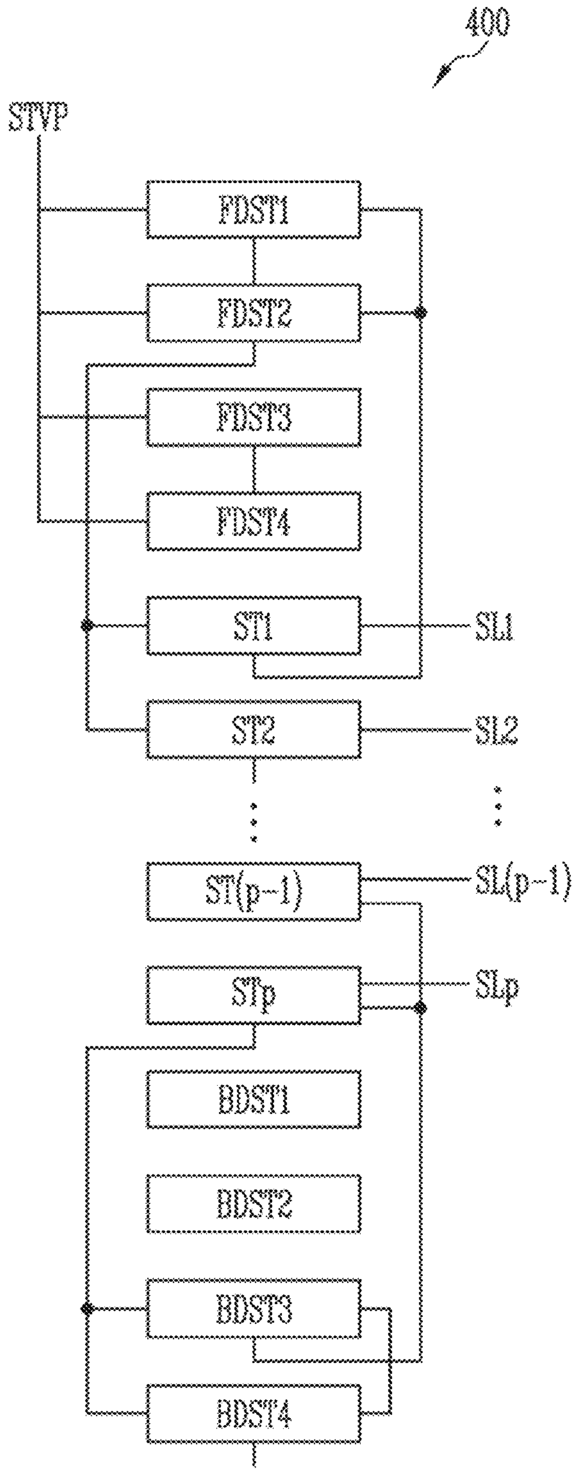
FIG. 4 is a diagram schematically illustrating a scan driver of the display device according to an embodiment of the invention.

FIG. 4 is a diagram schematically illustrating a scan driver according to an embodiment of the invention. FIG. 4 provides a simplified representation of wirings inside the scan driver 400.

Referring to FIGS. 1 and 4, the scan driver 400 will be described in detail. The scan driver 400 may include a plurality of stage circuits. For example, the scan driver 400 may include front dummy units FDST1 to FDST4 (e.g., dummy stages or dummy stage circuits), main units ST1 to STp (e.g., main stages or main stage circuit), and back dummy units BDST1 to BDST4 as the stage circuits.

However, the number of front dummy units and the number of back dummy units are not limited to those shown in FIG. 4. The number of front dummy units and the number of back dummy units may form various combinations. For example, there may be less than four back dummy units in alternate embodiments.

However, for convenience of description, in FIGS. 5A to 10, it is assumed that a fourth back dummy unit BDST4 is the last back dummy unit (or the last stage circuit among the stage circuits).

The main units ST1 to STp may be connected one-to-one with the scan lines to output respective scan signals. For example, a first main unit ST1 may output the scan signal to a first scan line SL1.

The stage circuits may receive the scan start signal STVP, the reset power source VSS, and the clock signal CLK from the clock generation unit 120.

According to an embodiment, the first to fourth front dummy units FDST1 to FDST4 use the scan start signal STVP as an initialization signal.

The main units ST1 to STp, which receive carry signals generated by the first to fourth front dummy units FDST1 to FDST4 that receive the scan start signal STVP, may be driven while sequentially outputting the scan signals. The output scan signals may be supplied to the display panel 200.

In addition, the first to fourth back dummy units BDST1 to BDST4 may provide a carry signal to some of the main units ST1 to STp. In addition, some of the main units may be initialized by the carry signal. For example, the carry signal output from the fourth back dummy unit BDST4 may initialize a p-th main unit STp.

In the scan driver 400 according to an embodiment of the invention, the fourth back dummy unit BDST4 initializes itself at the same time as initializing a preceding third back dummy unit BDST3. Here, the fourth back dummy unit BDST4 may be the last stage circuit among the stage circuits.

The stage circuits according to embodiments of the invention may include at least one or more back dummy units. In addition, the last back dummy unit (or the last stage circuit) among the back dummy units may initialize a previous unit (for example, another back dummy unit). At the same time, the last back dummy unit may initialize itself without receiving an input of a signal (for example, the reset signal) from the signal providing unit 100. More specifically, the last back dummy unit may initialize itself using the existing clock signal CLK without relying on a separate signal (for example, the reset signal). Accordingly, the signal providing unit 100 does not need to supply a signal (or the reset signal) to match the end time point of the frame period FR. For example, the signal providing unit 100 does not need to supply a signal (or the reset signal) in synchronization with the end time point of the frame period FR.

Figure 5A:
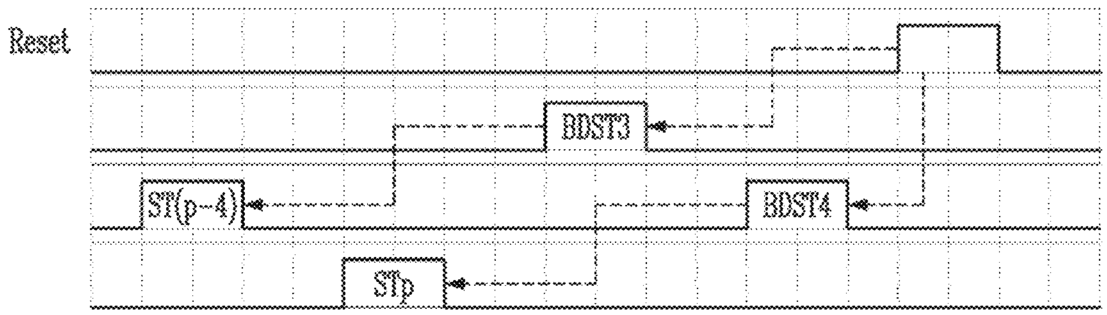
FIGS. 5A and 5B are comparative diagrams for explaining effects of the invention.
Figure 5B:
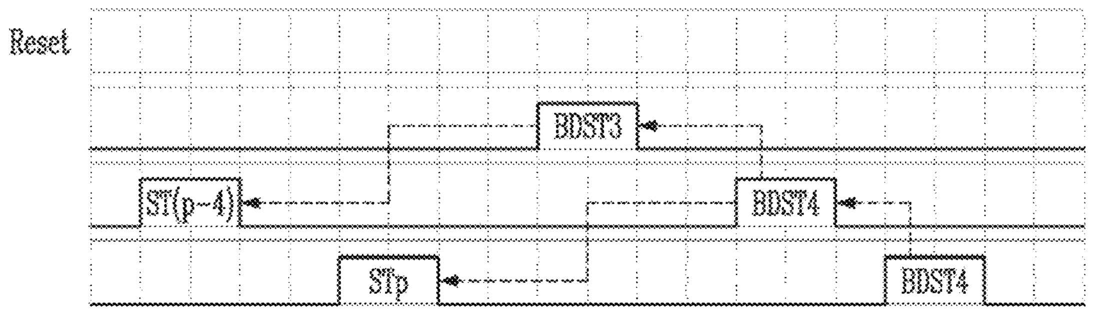

FIGS. 5A and 5B are comparative diagrams for explaining effects of embodiments of the invention. FIG. 5A is a diagram for explaining the initialization operation of a display device DD compared with the embodiments of the invention. FIG. 5B is a diagram for explaining the initialization operation of the display device DD according to embodiments of the invention. In FIGS. 5A and 5B, a reset signal Reset may be a signal that is supplied at the end time point of the frame period FR by the scan driver 400 (or the stage circuits).

Referring to FIG. 5A, in an initialization operation process of the display device DD to be compared with the embodiments of the invention, a carry signal output from the third back dummy unit BDST3 may initialize a (p-4)th main unit ST(p-4). A carry signal output from the fourth back dummy unit BDST4 may initialize the p-th main unit STp.

However, the third and fourth back dummy units BDST3 and BDST4 may be initialized at the time point when the reset signal Reset is supplied. Therefore, there may be a problem that the reset signal Reset needs to be supplied to the third and fourth back dummy units BDST3 and BDST4 in response to the end time point of one frame period FR.

Referring to FIG. 5B, in an initialization operation process of the display device (DD) according to an embodiment of the invention, a carry signal output from the third back dummy unit BDST3 may initialize the (p-4)th main unit ST (p-4). A carry signal output from the fourth back dummy unit BDST4 may initialize the p-th main unit STp.

In addition, the carry signal output from the fourth back dummy unit BDST4 may initialize the third back dummy unit BDST3 and the p-th main unit STp, while the fourth back dummy unit BDST4 initializes itself.

In other words, in the display device DD according to an embodiment of the invention, the initialization operation of the stage circuits is completed at the end time point of one frame period FR without supplying a separate reset signal Reset.

The structure of the last stage circuit for performing these operations will be described with reference to FIGS. 6 to 10.

Figure 6:
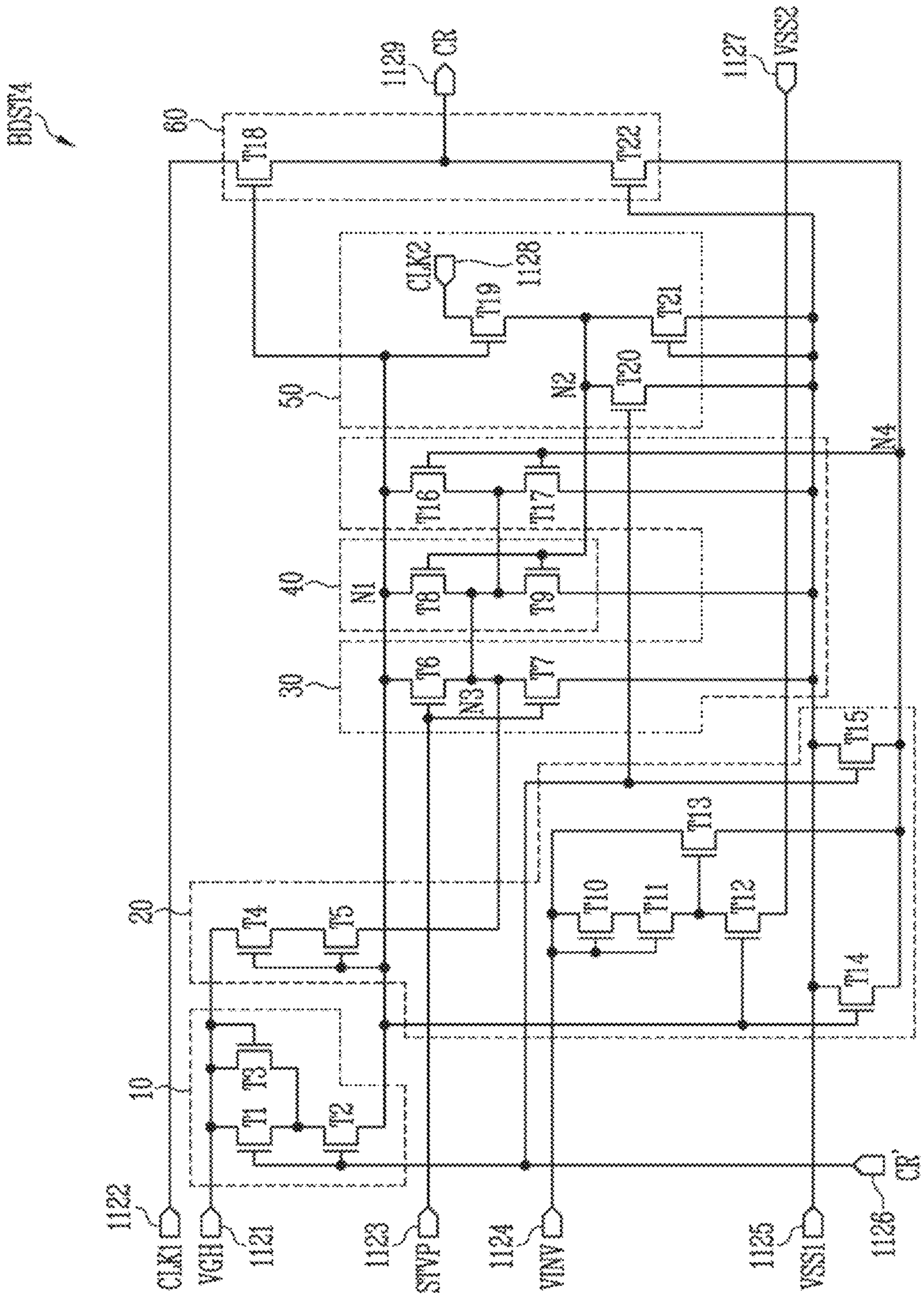
FIG. 6 is a schematic diagram of an equivalent circuit of a fourth back dummy unit of the scan driver according to an embodiment.

FIG. 6 is a schematic diagram of an equivalent circuit of a fourth back dummy unit according to an embodiment. Here, the fourth back dummy unit may be the last stage circuit among the stage circuits.

Referring to FIGS. 4 and 6, the fourth back dummy unit BDST4 may include an input unit 10 (e.g., an input circuit), an inverter unit 20 (e.g., an inverter circuit), an initialization control unit 30 (e.g., an initialization control circuit), an initialization unit 40 (e.g., an initialization circuit), a self-initialization signal unit 50 (e.g., a self-initialization signal circuit), and an output unit 60 (e.g., an output circuit). The clock signal CLK may include first and second clock signals CLK1 and CLK2. The reset power source VSS (or reset power voltage) may include first and second reset power sources VSS1 and VSS2 (or first and second power voltages).

The input unit 10 may include first to third transistors T1 to T3.

The first transistor T1 may have its first electrode connected to a first input terminal 1121, its second electrode connected to a first electrode of the second transistor T2, its gate electrode connected to a gate electrode of the second transistor T2 (or a sixth input terminal 1126). The first transistor T1 may be turned on in response to a carry signal CR' from a previous stage circuit (or the third back dummy unit BDST3).

The second transistor T2 may have its first electrode connected to the second electrode of the first transistor T1, its second electrode connected to a first node N1, and its gate electrode connected to the sixth input terminal 1126. The second transistor T2 may be turned on in response to the carry signal CR' from the previous stage circuit (or the third back dummy unit BDST3).

The third transistor T3 may have its first electrode and its gate electrode connected to the first input terminal 1121, and its second electrode connected to the second electrode of the first transistor T1.

The input unit 10 (e.g., an input circuit) may receive the gate high voltage VGH through the first input terminal 1121 such that the first node N1 is at a first level (e.g., a high level). More specifically, the input unit 10 may cause the first node N1 to reach the level of the gate high voltage VGH in response to the carry signal CR' of the previous stage circuit.

The inverter unit 20 (e.g., an inverter circuit) may include fourth and fifth transistors T4 and T5 and tenth to fifteenth transistors T10 to T15.

The fourth transistor T4 may have its first electrode connected to the first input terminal 1121, its gate electrode connected to the first node N1, and its second electrode connected to a first electrode of the fifth transistor T5.

The fifth transistor T5 may have its first electrode connected to the second electrode of the fourth transistor T4, its gate electrode connected to the first node N1, and its second electrode connected to a third node N3.

The tenth transistor T10 may have its first electrode connected to a fourth input terminal 1124, its gate electrode connected to the fourth input terminal 1124, and its second electrode connected to a first electrode of the eleventh transistor T11.

The eleventh transistor T11 may have its first electrode connected to the second electrode of the tenth transistor T10, its gate electrode connected to the fourth input terminal 1124, and its second electrode connected to a gate electrode of a thirteenth transistor T13.

The twelfth transistor T12 may have its first electrode connected to the gate electrode of the thirteenth transistor T13, its gate electrode connected to the second electrode of the second transistor T2, and its second electrode connected to a seventh input terminal 1127.

The thirteenth transistor T13 may have its first electrode connected to the fourth input terminal 1124, its gate electrode connected to the second electrode of the eleventh transistor T11, and its second electrode connected to a fourth node N4.

The fourteenth transistor T14 may have its first electrode connected to a fifth input terminal 1125, its gate electrode connected to the second electrode of the second transistor T2, and its second electrode connected to the fourth node N4.

The fifteenth transistor T15 may have its first electrode connected to the fifth input terminal 1125, its gate electrode connected to the gate electrode of the second transistor T2, and its second electrode connected to the fourth node N4.

The inverter unit 20 may maintain the first node N1 at the high level. More specifically, the inverter unit 20 may assist in maintaining the first node N1 at the level of the gate high voltage VGH until a designated time point. In addition, the inverter unit 20 may perform a function of changing a voltage level of the third node N3 according to a voltage level of the first node N1.

The initialization control unit 30 (e.g., an initialization control circuit) may include sixth and seventh transistors T6 and T7 and sixteenth and seventeenth transistors T16 and T17.

The sixth transistor T6 may have its first electrode connected to the first node N1, its gate electrode connected to a third input terminal 1123, and its second electrode connected to the third node N3. The sixth transistor T6 may be turned on by the scan start signal STVP.

The seventh transistor T7 may have its first electrode connected to the third node N3, its gate electrode connected to the third input terminal 1123, and its second electrode connected to the fifth input terminal 1125. The seventh transistor T7 may be turned on by the scan start signal STVP.

The sixteenth transistor T16 may have its first electrode connected to the first node N1, its gate electrode connected to the fourth node N4, and its second electrode connected to the third node N3.

The seventeenth transistor T17 may have its first electrode connected to the third node N3, its gate electrode connected to the fourth node N4, and its second electrode connected to the fifth input terminal 1125.

The initialization control unit 30 may perform a function of controlling the initialization unit 40 (e.g., an initialization circuit) so that the first node N1 is initialized by the initialization unit 40 according to the level of a second node N2 when the first node N1 reaches the high level and the first clock signal CLK1 is output to the output unit 60 (e.g., an output circuit).

The initialization unit 40 may include eighth and ninth transistors T8 and T9.

The eighth transistor T8 may have its first electrode connected to the first node N1, its gate electrode connected to the second node N2, and its second electrode connected to the third node N3.

The ninth transistor T9 may have its first electrode connected to the second electrode of the eighth transistor T8 (or the third node N3), its gate electrode connected to the gate electrode of the eighth transistor T8 (or the second node N2), and its second electrode connected to the fifth input terminal 1125.

The eighth and ninth transistors T8 and T9 may be turned on depending on the level of the second node N2. In this case, the initialization unit 40 may perform an initialization function so that the potential of the first node N1 is pulled down. For example, the initialization unit 40 is responsible for reducing the voltage level (potential) of the first node N1 to a lower state such as the first reset power source VSS1.

The self-initialization signal unit 50 may include nineteenth to twenty-first transistors T19 to T21.

The nineteenth transistor T19 may have its first electrode connected to an eighth input terminal 1128, its gate electrode connected to the first node N1, and its second electrode connected to the second node N2.

The twentieth transistor T20 may have its first electrode connected to the second node N2, its gate electrode connected to the sixth input terminal 1126, and a second electrode connected to the fifth input terminal 1125. The twentieth transistor T20 may be turned on in response to the carry signal CR' received from the previous stage circuit (or the third back dummy unit BDST3).

When the twentieth transistor T20 is turned on, the second node N2 may be initialized to the first reset power source VSS1, ensuring proper operation when the first node N1 is at the high level.

The twenty-first transistor T21 may have its first electrode connected to the second node N2, its gate electrode connected to the fifth input terminal 1125, and its second electrode connected to the fifth input terminal 1125.

The twenty-first transistor T21 may have a diode structure in which the gate electrode and the second electrode are connected to the first reset power source VSS1 and may discharge the second node N2.

In a state when the first node N1 is at the high level (or a voltage level of the gate high voltage VGH), the second node N2 may reach a high level when the second clock signal CLK2 is input to the first electrode of the nineteenth transistor T19. When the second node N2 reaches the high level, the eighth transistor T8 and the ninth transistor T9 constituting the initialization unit 40 may be turned on. In addition, the potential of the first node N1 may be pulled down by the first reset power source VSS1 and initialized. Thereafter, the potential of the second node N2 may gradually reach the first reset power source VSS1 due to the twentieth and twenty-first transistors T20 and T21.

In some embodiments, the last stage circuit (or the fourth back dummy unit BDST4) among the stage circuits constituting the scan driver 400 includes the self-initialization signal unit 50. The self-initialization signal unit 50 may use the existing clock signal (for example, the second clock signal CLK2) to cause the second node N2 to reach the high level at the time point at which it should be initialized by the initialization unit 40. In other words, the last stage circuit may determine by itself the time point at which it should be initialized by the initialization unit 40. There is no need to input a separate signal (for example, a start signal) to initialize the last stage circuit by the initialization unit 40. For example, the last stage circuit (e.g., the fourth back dummy unit BDST4) can autonomously initialize itself without requiring an external control signal (such as a start signal STVP) from the signal providing unit 100 or the timing controller 110. Instead, the initialization unit 40 triggers the reset process internally using the existing clock signal CLK or carry signal CR from the previous stage (e.g., the third back dummy unit BDST3), ensuring that BDST4 initializes at the correct time without external intervention. Even if the length of the frame period FR changes due to the changing driving frequency, the initialization operation of the stage circuits can be completed efficiently because there is no need to input a separate signal at the end time point of the frame period FR.

The output unit 60 may include an eighteenth transistor T18 and a twenty-second transistor T22.

The eighteenth transistor T18 may have its first electrode connected to a second input terminal 1122, its gate electrode connected to the first node N1, and its second electrode connected to an output terminal 1129.

The twenty-second transistor T22 may have its first electrode connected to the output terminal 1129, its gate electrode connected to the fifth input terminal 1125, and its second electrode connected to the fourth node N4.

The output unit 60 may output the first clock signal CLK1 as the carry signal CR to the output terminal 1129. The output carry signal CR may initialize the p-th main unit STp (or the last main unit among the main units). At the same time, the output carry signal CR may initialize the third back dummy unit BDST3 (or a previous back dummy unit).

Figure 7:
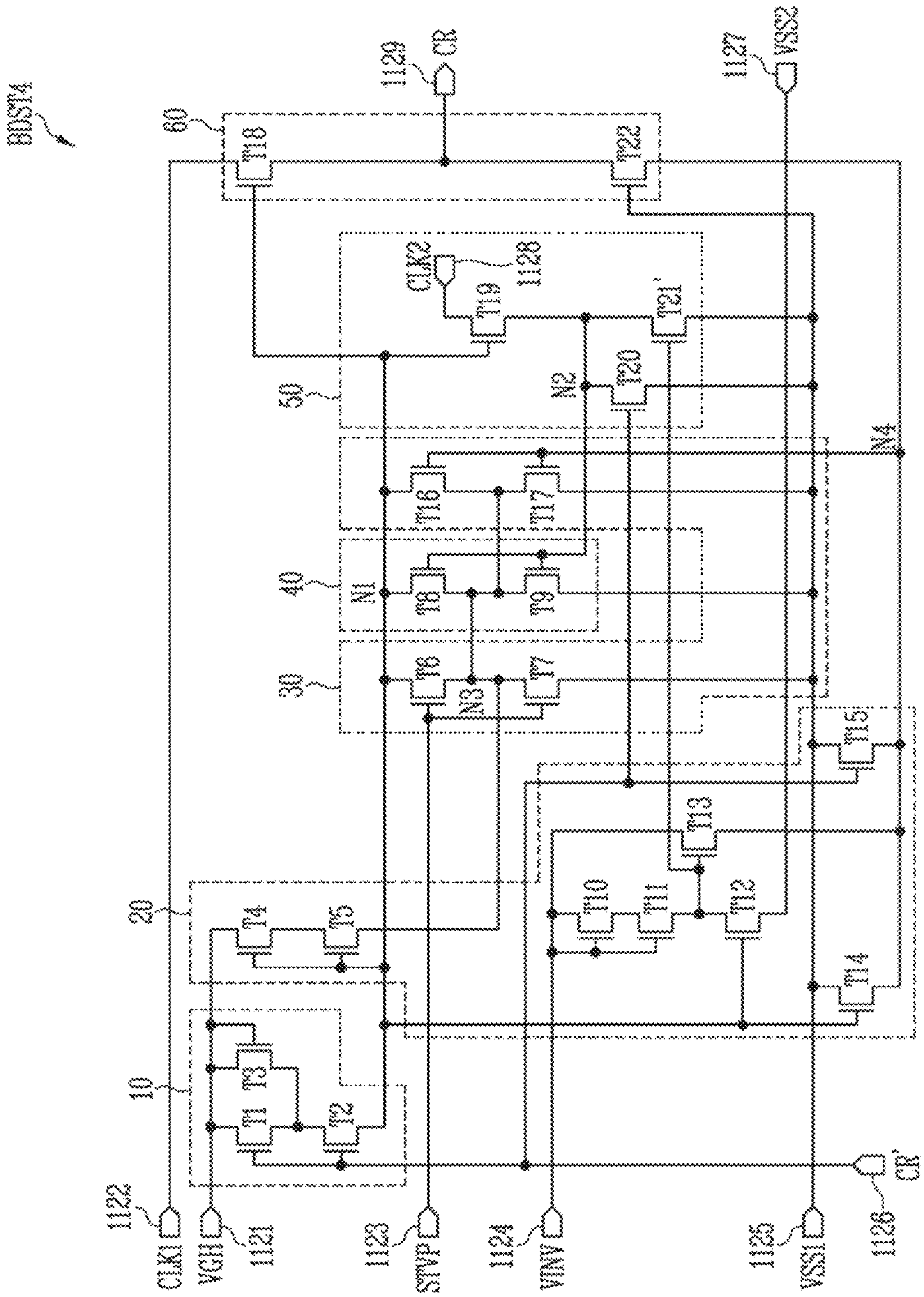
FIG. 7 is a schematic diagram of an equivalent circuit of the fourth back dummy unit according to an embodiment.

FIG. 7 is a schematic diagram of an equivalent circuit of a fourth back dummy unit according to an embodiment. Here, the fourth back dummy unit may be the last stage circuit among the stage circuits.

Referring to FIGS. 4 and 7, compared with the embodiment of FIG. 6, the connection structure of a gate electrode of a twenty-first transistor T21' in FIG. 7 is different from the connection structure of the gate electrode of the twenty-first transistor T21 in FIG. 6. Hereinafter, redundant descriptions of other configurations will be omitted.

The gate electrode of the twenty-first transistor T21' may be connected to the gate electrode of the thirteenth transistor T13.

In the twenty-first transistor T21 (see FIG. 6), a voltage difference between the gate electrode and the second electrode may be 0. Accordingly, the magnitude of current flowing from the twenty-first transistor T21 to the fifth input terminal 1125 may be smaller than that of the twenty-first transistor T21'. Accordingly, the time taken for the second node N2 to reach a voltage level of the first reset power source VSS1 in FIG. 6 may be delayed compared with the embodiment of FIG. 7.

On the other hand, the gate electrode of the twenty-first transistor T21' may be connected to the gate electrode of the thirteenth transistor T13, and a voltage difference between the gate electrode and the second electrode of the twenty-first transistor T21' may be greater than 0. Accordingly, the magnitude of current flowing from the twenty-first transistor T21' to the fifth input terminal 1125 may be greater than that of the twenty-first transistor T21. Accordingly, the time taken for the second node N2 to reach the voltage level of the first reset power source VSS1 in the embodiment of FIG. 7 may be faster compared with the embodiment of FIG. 6.

Figure 8:
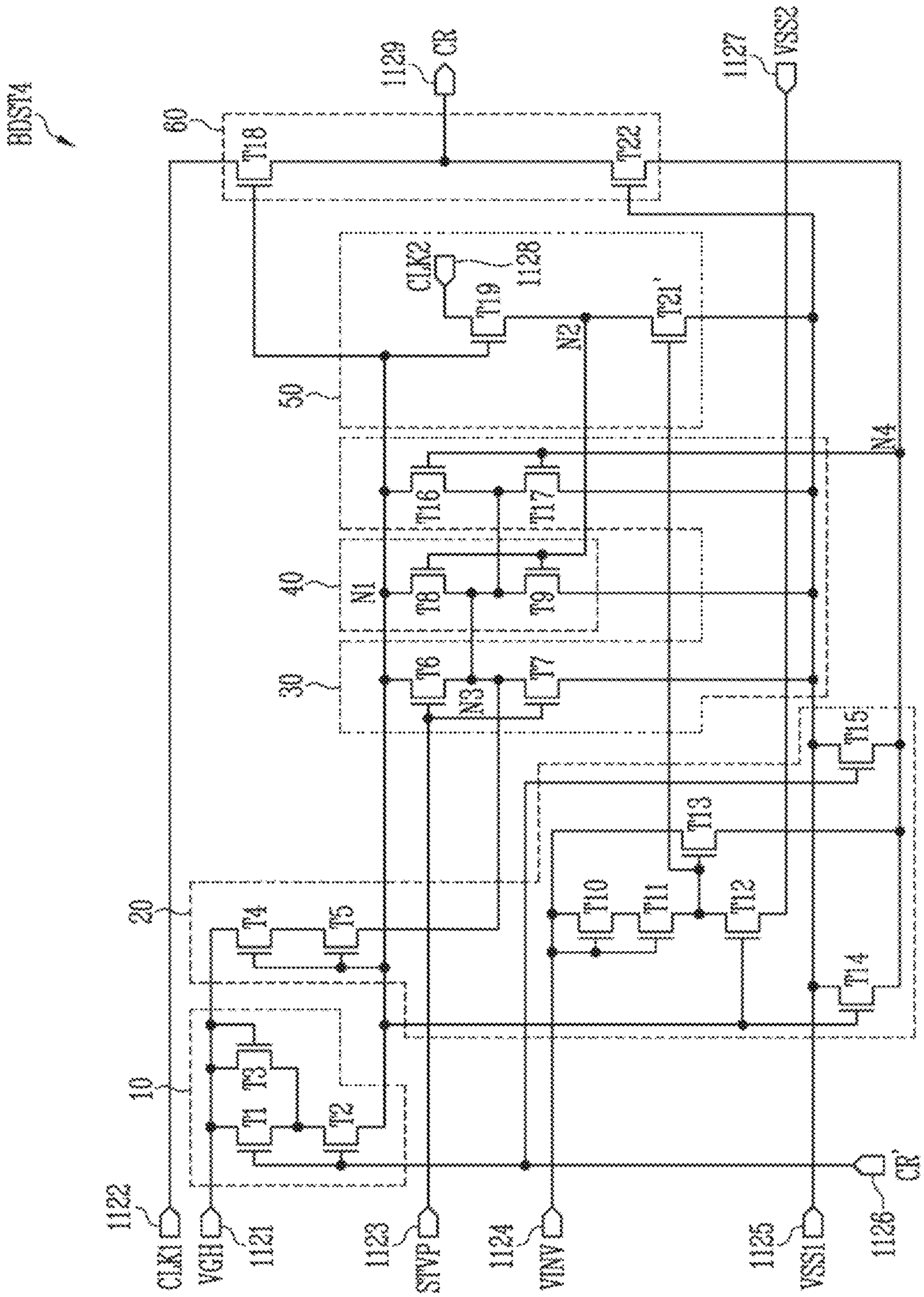
FIG. 8 is a schematic diagram of an equivalent circuit of the fourth back dummy unit according to an embodiment.

FIG. 8 is a schematic diagram of an equivalent circuit of a fourth back dummy unit according to an embodiment. Here, the fourth back dummy unit may be the last stage circuit among the stage circuits.

Referring to FIGS. 4 and 8, compared with the embodiment of FIG. 7, the twentieth transistor T20 is omitted in the embodiment of FIG. 8.

In the twenty-first transistor T21', a voltage difference between its gate electrode and its second electrode may be greater than 0. Accordingly, the magnitude of current flowing from the twenty-first transistor T21' to the fifth input terminal 1125 may be sufficient for the second node N2 to reach the voltage level of the first reset power source VSS1.

Therefore, compared with the embodiment of FIG. 7, the embodiment of FIG. 8 may omit one transistor (for example, the twentieth transistor T20), which may be advantageous in terms of space utilization and cost.

Figure 9:
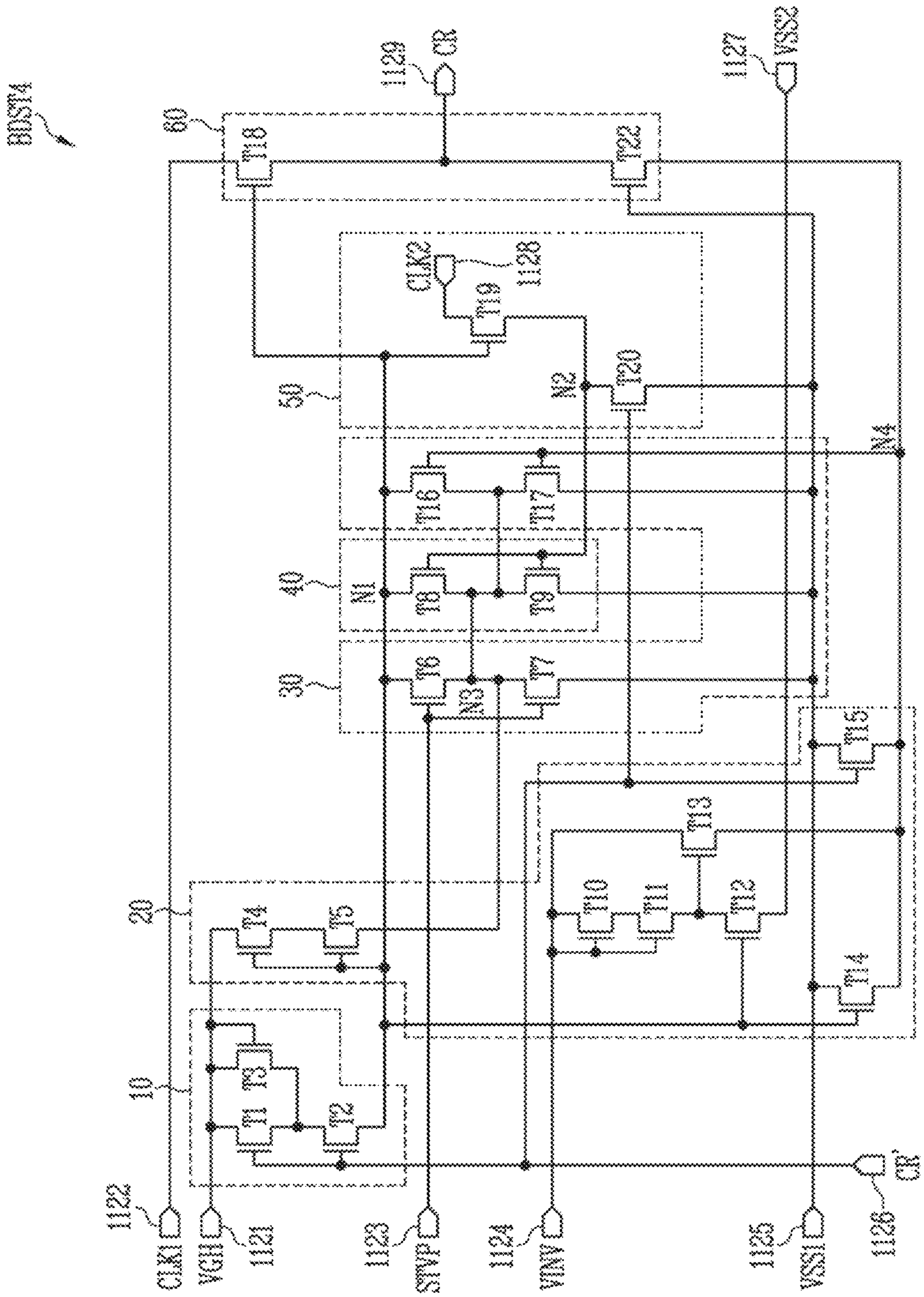
FIG. 9 is a schematic diagram of an equivalent circuit of a fourth back dummy unit according to an embodiment.

FIG. 9 is a schematic diagram of an equivalent circuit of a back dummy unit according to an embodiment. Here, the fourth back dummy unit may be the last stage circuit among the stage circuits.

Referring to FIGS. 4 and 9, compared with the embodiment of FIG. 6, the twenty-first transistor T21 is omitted in the embodiment of FIG. 9.

The magnitude of current flowing from the twentieth transistor T20 to the fifth input terminal 1125 may be sufficient for the second node N2 to reach the voltage level of the first reset power source VSS1.

Therefore, compared with the embodiment of FIG. 6, the embodiment of FIG. 9 omits one transistor (for example, the twenty-first transistor T21), which may be advantageous in terms of space utilization and cost.

Figure 10:
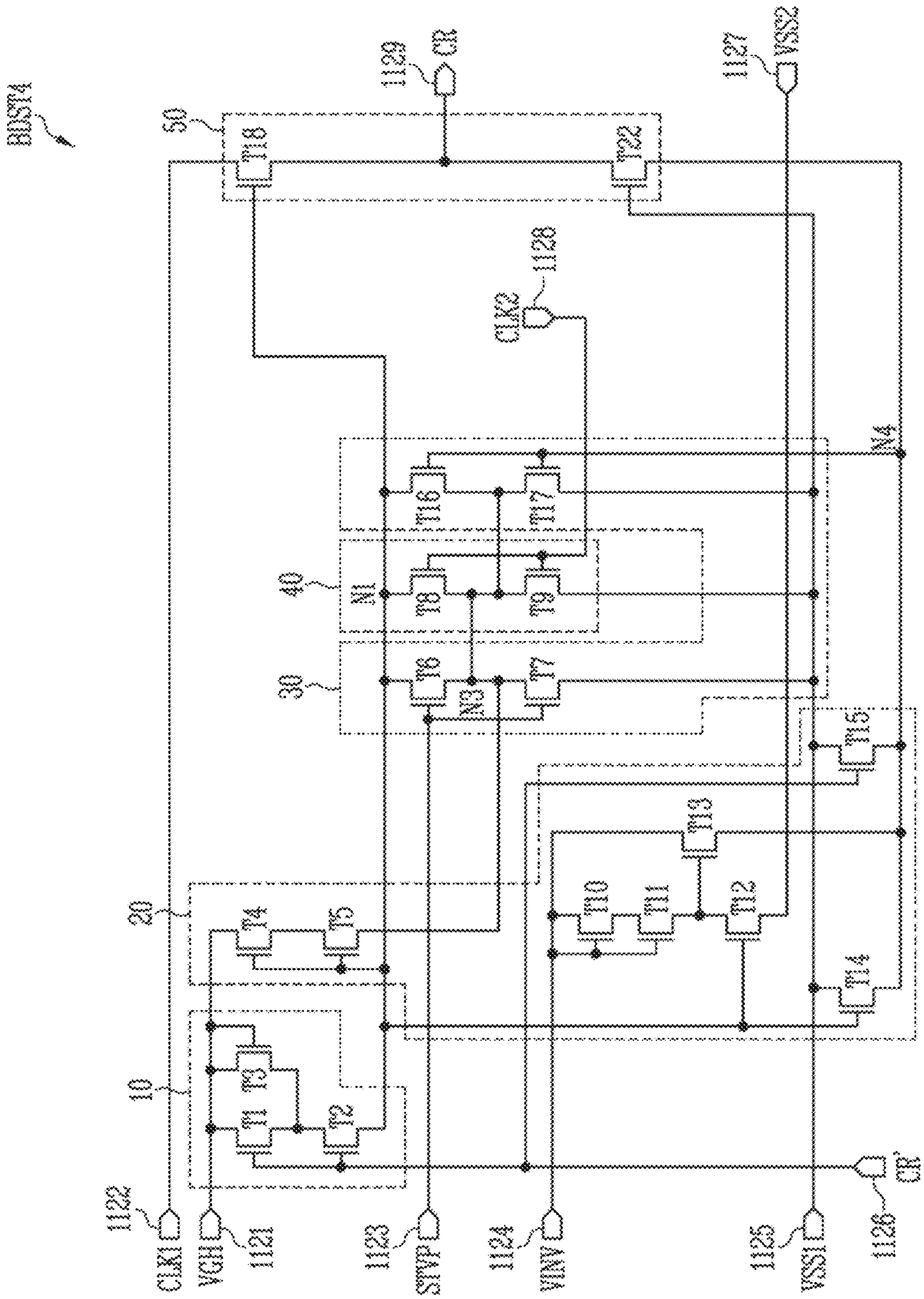
FIG. 10 is a schematic diagram of an equivalent circuit of a fourth back dummy unit according to an embodiment.

FIG. 10 is a schematic diagram of an equivalent circuit of a fourth back dummy unit according to an embodiment. Here, the fourth back dummy unit may be the last stage circuit among the stage circuits.

Referring to FIGS. 4 and 10, compared with the embodiment of FIG. 6, the nineteenth to twenty-first transistors T19 to T21 are omitted in the embodiment of FIG. 10.

The operation process in the embodiment of FIG. 10 may be as follows.

The input unit 10 may receive the carry signal CR' of the previous stage circuit, and the first node N1 may be maintained at the voltage level of the gate high voltage VGH.

In addition, the fourth back dummy unit BDST4 may output the carry signal CR to initialize the previous stage circuit (or the third back dummy unit BDST3) and the p-th main unit STp.

In addition, the initialization unit 40 may receive the second clock signal CLK2. The eighth and ninth transistors T8 and T9 constituting the initialization unit 40 may be turned on, allowing the first reset power source VSS1 to pull down the voltage of the first node N1. Accordingly, the fourth back dummy unit BDST4 may initialize itself.

In the embodiment of FIG. 10, the last stage circuit (or the fourth back dummy unit BDST4) may initialize itself using the existing clock signal (or the second clock signal CLK2), so that there may be no need to input a separate signal to the last stage circuit according to the timing.

In an embodiment, the scan driver 400 includes a plurality of main stage circuits (ST1, ST2, . . . , STn), each configured to sequentially provide a scan signal to the display panel 200, and a plurality of back stage circuits (BDST1, BDST2, . . . , BDSTm) connected in series with the plurality of main stage circuits. The plurality of back stage circuits include a last back stage circuit (BDSTm) comprising a self-initialization signal circuit 50 configured to generate a control signal to trigger initialization of the last back stage circuit in response to a clock signal (e.g., CLK1), and an initialization circuit 40 configured to perform initialization of the last back stage circuit based on the control signal generated by the self-initialization signal circuit 50. Additionally, the plurality of back stage circuits include at least one other back stage circuit (BDSTm-1) preceding the last back stage circuit, wherein the at least one other back stage circuit is configured to receive an initialization signal (e.g., a carry signal CR) from a preceding stage and transmit an initialization signal to a following stage in response to the received initialization signal.

In an embodiment, a main stage such as ST1 or a back stage other than the last back stage may be structured using the designs illustrated in FIGS. 6-10, with the initialization unit 40 and the self-initialization signal unit 50 omitted. This highlights how earlier main stages in the scan driver 400 might share a similar underlying structure with the last stage while operating differently due to their reliance on external signals.

Figure 11:
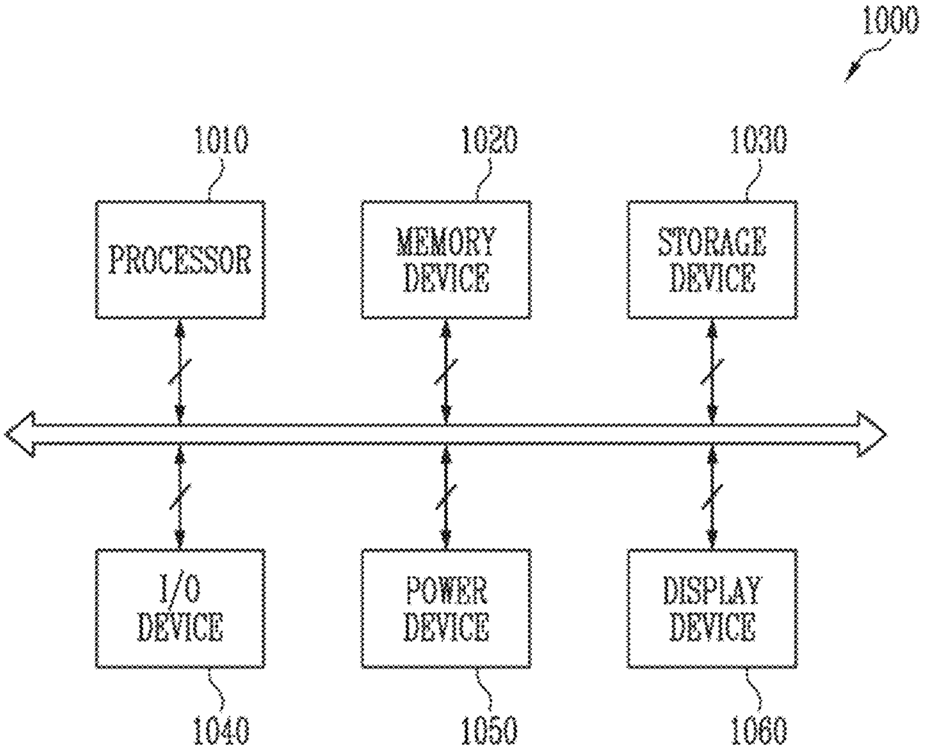
FIG. 11 is a block diagram illustrating an electronic device according to an embodiment of the invention.
Figure 12:
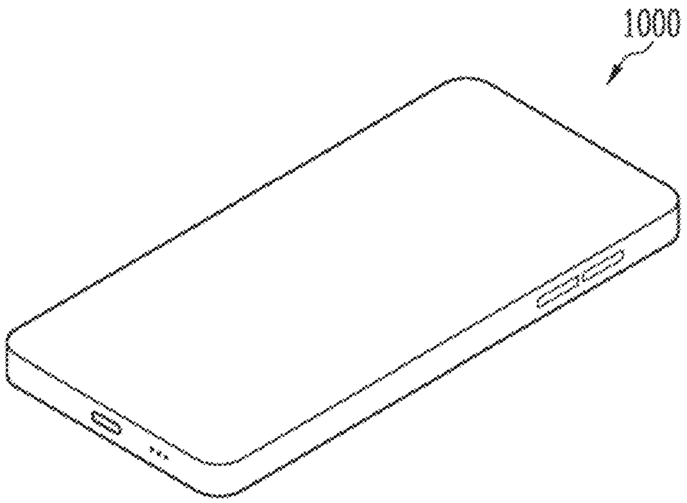
FIG. 12 is a diagram illustrating an example in which the electronic device of FIG. 11 is implemented as a smartphone.

FIG. 11 is a block diagram illustrating an electronic device according to an embodiment of the invention. FIG. 12 is a diagram illustrating an example in which the electronic device of FIG. 11 is implemented as a smartphone.

Referring to FIGS. 11 and 12, an electronic device 1000 may include a processor 1010, a memory device 1020, a storage device 1030, an input/output device 1040, a power device 1050, and a display device 1060. In this case, the display device 1060 may be the display device DD of FIG. 1. In addition, the electronic device 1000 may further include several ports that can communicate with a video card, a sound card, a memory card, a universal serial bus (USB) device, and the like, or with other systems. In an embodiment, as shown in FIG. 12, the electronic device 1000 may be implemented as a smartphone. However, this is merely an example, and the electronic device 1000 is not limited thereto. For example, the electronic device 1000 may be implemented as a mobile phone, a video phone, a smart pad, a smart watch, a tablet PC, a vehicle navigation system, a computer monitor, a laptop PC, a head-mounted display device, or the like.

The processor 1010 may perform specific calculations or tasks. According to an embodiment, the processor 1010 may be a microprocessor, a central processing unit, an application processor, or the like. The processor 1010 may be connected to other components through an address bus, a control bus, a data bus, and the like. According to an embodiment, the processor 1010 may also be connected to an expansion bus, such as a peripheral component interconnect (PCI) bus.

The processor 1010 may supply signals to the display device 1060. For example, the processor 1010 may supply an image signal RGB and an external input signal to the display device 1060. For example, the image signal RGB may include red image data, green image data, and blue image data. In an embodiment, the image signal RGB may further include white image data. For another example, the image signal RGB may include magenta image data, yellow image data, and cyan image data. The external input signal may include a master clock signal and a data enable signal DE. The external input signal may further include a vertical synchronization signal Vsync and a horizontal synchronization signal.

The processor 1010 may provide a gate-on voltage Von and a gate-off voltage Voff to the display device 1060.

The memory device 1020 may store data necessary for the operation of the electronic device 1000. For example, the memory device 1020 may include a non-volatile memory device, such as an EPROM (erasable programmable read-only memory) device, an EEPROM (electrically erasable programmable read-only memory) device, a flash memory device, a PRAM (phase change random access memory) device, a RRAM (resistance random access memory) device, a NFGM (nano floating gate memory) device, a PoRAM (polymer random access memory) device, a MRAM (magnetic random access memory) device, or a FRAM (ferroelectric random access memory) device, and/or a volatile memory device, such as a DRAM (dynamic random access memory) device, a SRAM (static random access memory) device, or a mobile DRAM device.

The storage device 1030 may include a solid state drive (SSD), a hard disk drive (HDD), a compact disc read only memory (CD-ROM), or the like.

The input/output device 1040 may include an input means, such as a keyboard, a keypad, a touchpad, a touch screen, and a mouse, and an output means, such as a speaker and a printer. According to an embodiment, the display device 1060 may be included in the input/output device 1040.

The power device 1050 may supply power sources required to operate the electronic device 1000. For example, the power device 1050 may be a power management integrated circuit (PMIC).

The display device 1060 may display an image corresponding to visual information of the electronic device 1000. In this case, the display device 1060 may be an organic light emitting display device or a quantum dot light emitting display device, but the invention is not limited thereto. The display device 1060 may be connected to other components through the buses or other communication links.

Figure 13:
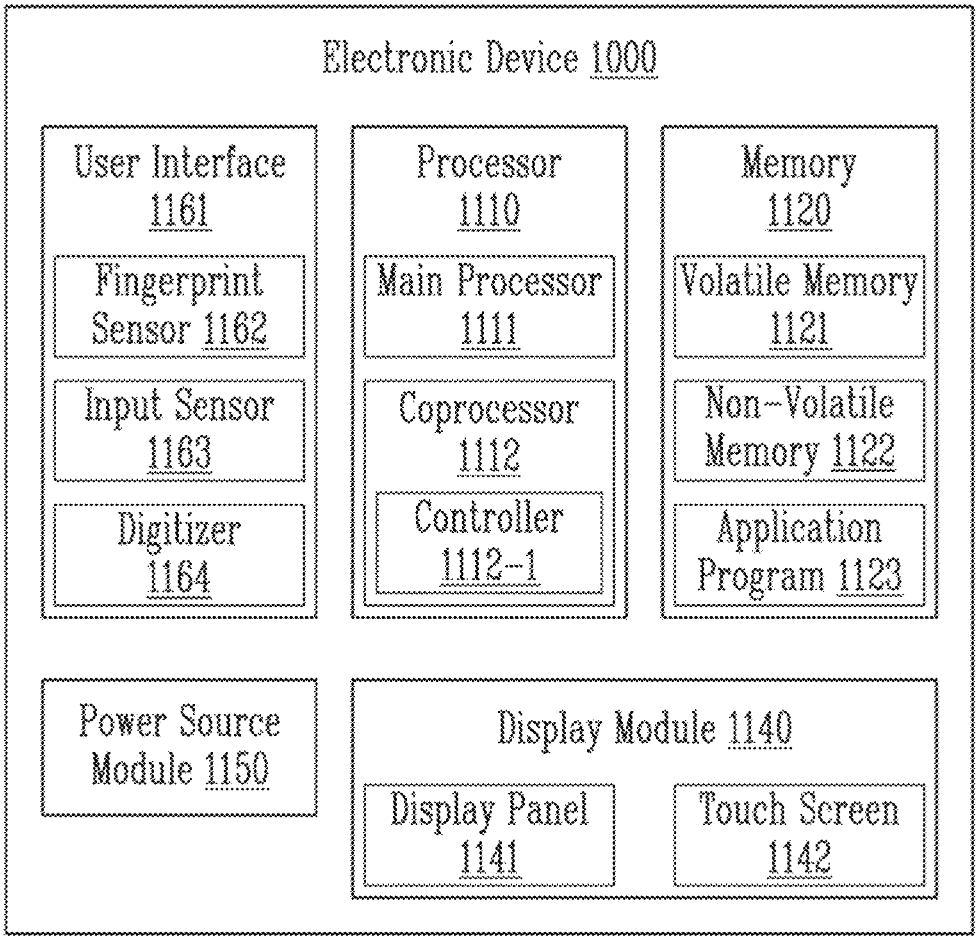
FIG. 13 is a block diagram illustrating an electronic device according to an embodiment of the invention.

FIG. 13 is a diagram illustrating an electronic device according to an embodiment of the present invention. Referring to FIG. 13, the electronic device 1000 according to one embodiment of the present invention may output various information (e.g., images, text, music, etc.) through a display module 1140, which, for example, may correspond to the display device shown in FIG. 1. When a processor 1110 executes an application stored in a memory 1120, the display module 1140 may provide application information to a user through a display panel 1141. For example, the display module 1140 may be used to implement the display device 1060. For example, the memory 1120 may be used to implement the memory device 1020 or the storage device 1030. For example, the processor 1110 may be used to implement the processor 1010.

In some embodiments, the electronic device 1000 may be configured as a smartphone, camera, smart TV, monitor, smartwatch, tablet, automotive display, or AR/VR headset. For example, the electronic device 1000 may be a smartphone including a touch-sensitive display area DA for interaction and a non-display area NDA including sensors and circuits for enhanced functionality. For example, the electronic device 1000 may be a television or monitor including a large display area DA for high-resolution video playback and a non-display area NDA incorporating driving circuits or connectivity modules for external inputs. For example, the electronic device 1000 may be a smartwatch including a display area DA optimized for compact and high-clarity visuals and a non-display area NDA integrating biometric sensors for health monitoring. In some cases, the electronic device 1000 be an AR/VR headset.

In some embodiments, memory 1120 may store information such as software codes for operating an application program 1123. The application program 1123 may include a software designed to execute specific tasks or provide functionality to a user. The application program 1123 may operate under the control of the processor 1110 and utilizes data stored in the memory 1120 to deliver a wide range of features, such as productivity tools, multimedia streaming and playback, file or mail deliveries or communication services. The application program 1123 interacts seamlessly with the user interface 1161 or touch screen 1142, allowing a user to launch, navigate, and utilize the program through user inputs such as touch, tap, gesture, or voice interaction.

Upon user selection of an application via touch screen 1142 or user interface 1161, the processor 1110 may execute the application program 1123 corresponding to the selected application retrieved from the memory 1120 to perform functionalities of the application. For example, when a user selects a camera application by tapping the icon (or a camera application icon) presented on the display panel 1141, the processor 1110 activates a camera module. The processor 1110 may transmit image data corresponding to a captured image acquired through the camera module to the display module 1140. The display module 1140 may display an image corresponding to the captured image through the display panel 1141.

As another example, when a user wishes to make a phone call, the user taps the telephone icon displayed on the display module 1140, the processor 1110 may execute a phone application program stored in the memory 1120. A telephone keypad may be presented on the display panel 1141 for the user to enter a phone number to call.

As another example, the display module 1140 may be integrated into an electronic device 1000, such as a laptop computer, smart TV, or tablet. A user wishing to access a multimedia streaming application (e.g., to watch a music video or movie) can do so by tapping the corresponding icon. This action activates the application, allowing the user to view the streamed content.

The processor 1110 may include a main processor 1111 and an auxiliary or coprocessor 1112. The main processor 1111 may include a central processing unit (CPU). The main processor 1111 may further include one or more of a graphics processing unit (GPU), a communication processor (CP), and an image signal processor (ISP).

The coprocessor 1112 may include a controller 1112-1. The controller 1112-1 may include an interface conversion circuit and a timing control circuit. The controller 1112-1 may receive an image signal from the main processor 1111, convert the data format of the image signal to match the interface specifications with the display module 1140, and output image data. The controller 1112-1 may output various control signals to drive the display module 1140. For example, the controller 1112-1 may drive the display module 1140 to display the icon on the display screen suitable for selection by a user to cause execution of an application program 1123.

The memory 1120 may store one or more application programs 1123 and various data used by at least one component (for example, the processor 1110 or the user interface 1161) of the electronic device 1000 and input data or output data for commands related thereto. For example, a camera application program, a GPS application program, an augmented reality and virtual reality application program, and other application programs that can be executed by the processor 1110 upon selection of corresponding icons presented on the display screen (or display panel 1141) via the touch screen 1142 or user interface 1161 by the user. In addition, various setting data corresponding to user settings may be stored in the memory 1120. The memory 1120 may include volatile memory 1121 and non-volatile memory 1122.

The display module 1140 may output visual information (images) to the user. The display module 1140 may include the display panel 1141, a gate driver, the source driver, a voltage generation circuit, and a touch screen 1142. For example, the touch screen 1142 may be included within the input/output device 1040. The display module 1140 may further include a window, a chassis, and a bracket to protect the display panel 1141. The display module 1140 may include at least a part of the configuration of the display device shown in FIG. 1.

The user interface 1161 serves as the interaction medium between a user and the electronic device 1000. The user interface 1161 may detect an input by a part (e.g., finger) of a user's body or an input by a pen or a mouse, and generate an electric signal or data value corresponding to the input. The user interface 1161 includes the fingerprint sensor 1162, the input sensor 1163, and a digitizer 1164. For example, the fingerprint sensor 1162, the input sensor 1163, and a digitizer 1164 may be included within the input/output device 1040.

The fingerprint sensor 1162 may sense a fingerprint for biometric recognition of the user and may also measure one or more biological signals such as blood pressure, moisture, or body mass.

The input sensor 1163 may sense user interactions including touch, tap, gesture, motion, spoken command, and eye movement. The input sensor 1163 includes optical sensors for image capture, eye tracking, or motion and gesture detection. Optical sensors may be infrared or semiconductor photodetectors. The input sensor 1163 includes audio and acoustic sensors, which may be MEMS microphones for voice recognition or sound-based interaction. The audio and acoustic sensors can be installed as part of the user interface 1161 or embedded in the display panel 1141.

The digitizer 1164 may generate a data value corresponding to coordinate information of input by a pen or a mouse to control movement of an onscreen cursor. The digitizer 1164 may generate the amount of change in electromagnetic due to the input as the data value. The digitizer may detect an input by a passive pen or transmit and receive data with an active pen or a remote.

At least one of the fingerprint sensor 1162, the input sensor 1163, or the digitizer 1164 may be implemented as a sensor layer formed on the top layer of the display panel 1141 through a continuous process with a process of forming elements (for example, the light emitting element, the transistor, and the like) included in the display panel 1141.

In addition, the user interface 1161 may further include, for example, a gesture sensor, a gyro sensor that senses rotational movements, an acceleration sensor to track translational movement, a grip sensor, a pressure sensor, a proximity sensor, a color sensor, an infrared (IR) emitter and camera sensor for tracking gaze direction and eye movements, a temperature sensor, or a light sensor. For example, the gyro sensor, acceleration sensor, and infrared emitter and camera may be particularly suitable for AR/VR headset functions.

The touch screen 1142 includes touch sensors embedded in semiconductor layers of the display panel 1141 to sense pressure applied to the top layer (screen) of the display panel 1141. The touch sensors can be a capacitive or a resistive type. The touch screen 1142 may serve as the primary interface for the user to select and navigate applications, control, and interact with the electronic device 1000.

The display panel 1141 (or display) may include a liquid crystal display panel, an organic light emitting display panel, or an inorganic light emitting display panel, and the type of the display panel 1141 is not particularly limited. The display panel 1141 may be of a rigid type or a flexible type that can be rolled or folded. The display module 1140 may further include a supporter, bracket, heat dissipation member, and the like that support the display panel 1141. The display panel 1141 may include the display unit shown in FIG. 1.

The power source module 1150 may supply power to the components of the electronic device 1000. The power source module 1150 may include a battery that charges the power source voltage. The battery may include a non-rechargeable primary battery or a rechargeable secondary battery or fuel cell. The power source module 1150 may include a power management integrated circuit (PMIC). The PMIC may supply optimized power source to each of the components described above including the display module 1140. For example, the power source module 1150 may be used to implement the power device 1050.

According to the embodiments of the invention, a stage (e.g., a stage circuit) capable of self-initialization at an intended time, even when the end time of a frame period varies due to changes in driving frequency, is provided, along with a scan driver using the same.

Although specific embodiments and implementations have been described herein, other embodiments and modifications may be derived from the foregoing descriptions. Accordingly, the spirit of the invention is not limited to the foregoing embodiments, but may also be applied to the claims set forth below, various obvious modifications, and equivalents.

What is claimed is:

1. A scan driver comprising:

a plurality of stage circuits, wherein a last stage circuit among the plurality of stage circuits comprises:

a self-initialization signal circuit charging a first node of the last stage circuit to a first level in response to a first clock signal;

an initialization circuit initializing the last stage circuit when the first node is at the first level;

an input circuit charging a second node of the last stage circuit to the first level in response to a gate voltage of a first logic level input to a first input terminal;

an inverter circuit changing a voltage level of a third node of the last stage circuit according to a voltage level of the second node;

an initialization control circuit controlling an operation of the initialization circuit in response to the voltage level of the third node; and an output circuit outputting a carry signal when the second node is at the first level, wherein the carry signal initializes a previous stage circuit.

2. The scan driver of claim 1, wherein the initialization circuit comprises:

a first transistor having a first electrode connected to the second node, a gate electrode connected to the first node, and a second electrode connected to the third node; and a second transistor having a first electrode connected to the third node, a gate electrode connected to the first node, and a second electrode connected to a first input terminal receiving a first reset power voltage.

3. The scan driver of claim 2, wherein the self-initialization signal circuit comprises:

a third transistor having a first electrode connected to a second input terminal receiving the first clock signal, a gate electrode connected to the second node, and a second electrode connected to the first node;

a fourth transistor having a first electrode connected to the first node, a gate electrode connected to a third input terminal receiving a carry signal from the previous stage circuit, and a second electrode connected to the first input terminal; and a fifth transistor having a first electrode connected to the first node, and a gate electrode and a second electrode connected to the first input terminal.

4. The scan driver of claim 2, wherein the self-initialization signal circuit comprises:

a third transistor having a first electrode connected to a second input terminal receiving the first clock signal, a gate electrode connected to the second node, and a second electrode connected to the first node;

a fourth transistor having a first electrode connected to the first node, a gate electrode connected to a third input terminal receiving a carry signal from the previous stage circuit, and a second electrode connected to the first input terminal; and a fifth transistor having a first electrode connected to the first node, a gate electrode connected to the inverter circuit, and a second electrode connected to the first input terminal.

5. The scan driver of claim 4, wherein the inverter circuit comprises a sixth transistor having a first electrode connected to the gate electrode of the fifth transistor, a gate electrode connected to the second node, and a second electrode connected to a fourth input terminal receiving a second reset power voltage.

6. The scan driver of claim 2, wherein the self-initialization signal circuit comprises:

a third transistor having a first electrode connected to a second input terminal receiving the first clock signal, a gate electrode connected to the second node, and a second electrode connected to the first node; and a fourth transistor having a first electrode connected to the first node, a gate electrode connected to the inverter circuit, and a second electrode connected to the first input terminal.

7. The scan driver of claim 6, wherein the inverter circuit comprises a fifth transistor having a first electrode connected to the gate electrode of the fourth transistor, a gate electrode connected to the second node, and a second electrode connected to a fourth input terminal receiving a second reset power voltage.

8. The scan driver of claim 2, wherein the self-initialization signal circuit comprises:

a third transistor having a first electrode connected to a second input terminal receiving the first clock signal, a gate electrode connected to the second node, and a second electrode connected to the first node; and a fourth transistor having a first electrode connected to the first node, a gate electrode connected to a third input terminal receiving a carry signal from the previous stage circuit, and a second electrode connected to the first input terminal.

9. A display device comprising:

a display panel comprising a plurality of pixels; and a scan driver supplying scan signals to the plurality of pixels, wherein the scan driver comprises a plurality of stage circuits, and wherein a last stage circuit among the plurality of stage circuits comprises:

a self-initialization signal circuit charging a first node of the last stage circuit to a first level in response to a first clock signal;

an initialization circuit initializing the last stage circuit when the first node is at the first level;

an input circuit charging a second node of the last stage circuit to the first level in response to a gate voltage of a first logic level input to a first input terminal;

an inverter circuit changing a voltage level of a third node of the last stage circuit according to a voltage level of the second node;

an initialization control circuit controlling an operation of the initialization circuit in response to the voltage level of the third node; and an output circuit outputting a carry signal when the second node is at the first level, wherein the carry signal initializes a previous stage circuit.

10. The display device of claim 9, wherein the initialization circuit comprises:

a first transistor having a first electrode connected to the second node, a gate electrode connected to the first node, and a second electrode connected to the third node; and a second transistor having a first electrode connected to the third node, a gate electrode connected to the first node, and a second electrode connected to a first input terminal receiving a first reset power voltage.

11. The display device of claim 10, wherein the self-initialization signal circuit comprises:

a third transistor having a first electrode connected to a second input terminal receiving the first clock signal, a gate electrode connected to the second node, and a second electrode connected to the first node;

a fourth transistor having a first electrode connected to the first node, a gate electrode connected to a third input terminal receiving a carry signal from the previous stage circuit, and a second electrode connected to the first input terminal; and a fifth transistor having a first electrode connected to the first node, and a gate electrode and a second electrode connected to the first input terminal.

12. The display device of claim 10, wherein the self-initialization signal circuit comprises:

a third transistor having a first electrode connected to a second input terminal receiving the first clock signal, a gate electrode connected to the second node, and a second electrode connected to the first node;

a fourth transistor having a first electrode connected to the first node, a gate electrode connected to a third input terminal receiving a carry signal from the previous stage circuit, and a second electrode connected to the first input terminal; and a fifth transistor having a first electrode connected to the first node, a gate electrode connected to the inverter circuit, and a second electrode connected to the first input terminal.

13. The display device of claim 12, wherein the inverter circuit comprises a sixth transistor having a first electrode connected to the gate electrode of the fifth transistor, a gate electrode connected to the second node, and a second electrode connected to a fourth input terminal receiving a second reset power voltage.

14. The display device of claim 10, wherein the self-initialization signal circuit comprises:

a third transistor having a first electrode connected to a second input terminal receiving the first clock signal, a gate electrode connected to the second node, and a second electrode connected to the first node; and a fourth transistor having a first electrode connected to the first node, a gate electrode connected to the inverter circuit, and a second electrode connected to the first input terminal.

15. The display device of claim 14, wherein the inverter circuit comprises a fifth transistor having a first electrode connected to the gate electrode of the fourth transistor, a gate electrode connected to the second node, and a second electrode connected to a fourth input terminal receiving a second reset power voltage.

16. The display device of claim 10, wherein the self-initialization signal circuit comprises:

a third transistor having a first electrode connected to a second input terminal receiving the first clock signal, a gate electrode connected to the second node, and a second electrode connected to the first node; and a fourth transistor having a first electrode connected to the first node, a gate electrode connected to a third input terminal receiving a carry signal from the previous stage circuit, and a second electrode connected to the first input terminal.

17. An electronic device comprising:

a display device for displaying an image, wherein the display device comprises:

a display panel comprising a plurality of pixels; and a scan driver providing a scan signal to each of the plurality of pixels, wherein the scan driver comprises a plurality of stage circuits, wherein a last stage circuit among the plurality of stage circuits comprises:

a self-initialization signal unit charging a first node of the last stage circuit to a first level in response to a first clock signal; and an initialization circuit initializing the last stage circuit when the first node is at the first level;

an input circuit charging a second node of the last stage circuit to the first level in response to a gate voltage of a first logic level input to a first input terminal;

an inverter circuit changing a voltage level of a third node of the last stage circuit according to a voltage level of the second node;

an initialization control circuit controlling an operation of the initialization circuit in response to the voltage level of the third node; and an output circuit outputting a carry signal when the second node is at the first level, wherein the carry signal initializes a previous stage circuit.

* * * * *